(12) United States Patent
Pope et al.

(10) Patent No.: US 8,650,569 B2
(45) Date of Patent: Feb. 11, 2014

(54) USER-LEVEL RE-INITIALIZATION INSTRUCTION INTERCEPTION

(75) Inventors: Steven Leslie Pope, Costa Mesa, CA (US); David James Riddoch, Fenstanton (GB); Greg Law, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 1247 days.

(21) Appl. No.: 11/900,377

(22) Filed: Sep. 10, 2007

(65) Prior Publication Data

US 2008/0072236 A1    Mar. 20, 2008

Related U.S. Application Data

(63) Continuation of application No. PCT/GB2006/000852, filed on Mar. 10, 2006.

(30) Foreign Application Priority Data

| Mar. 10, 2005 | (GB) | 0504987.9 |
| Mar. 15, 2005 | (GB) | 0505297.2 |
| Mar. 15, 2005 | (GB) | 0505299.8 |
| Mar. 15, 2005 | (GB) | 0505300.4 |
| Mar. 30, 2005 | (GB) | 0506403.5 |

(51) Int. Cl.
*G06F 9/46* (2006.01)

(52) U.S. Cl.
USPC .................. 718/100; 718/107; 709/249

(58) Field of Classification Search
None
See application file for complete search history.

(56) References Cited

U.S. PATENT DOCUMENTS

| 5,272,599 | A |   | 12/1993 | Koenen |
| 5,325,532 | A |   | 6/1994 | Crosswy et al. |
| 5,535,416 | A |   | 7/1996 | Feeney et al. |
| 5,550,816 | A | * | 8/1996 | Hardwick et al. ............ 370/397 |
| 5,603,020 | A | * | 2/1997 | Hashimoto et al. ................... 1/1 |

(Continued)

FOREIGN PATENT DOCUMENTS

| EP | 0 598 510 | 5/1994 |
| EP | 620521 | 3/1995 |

(Continued)

OTHER PUBLICATIONS

W. Richard Stevens, UNIX network programming, 1990, Prentice hall, ISBN: 0139498761.*

(Continued)

*Primary Examiner* — Emerson Puente
*Assistant Examiner* — Dong Kim
(74) *Attorney, Agent, or Firm* — Weide & Miller, Ltd.

(57) ABSTRACT

A data processing system comprising an operating system for supporting processes, such that the process are associated with one or more resources and the operating system being arranged to police the accessing by processes of resources so as to inhibit a process from accessing resources with which it is not associated. Part of this system is an interface for interfacing between each process and the operating system and a memory for storing state information for at least one process. The interface may be arranged to analyze instructions from the processes to the operating system, and upon detecting an instruction to re-initialize a process cause state information corresponding to that pre-existing state information to be stored in the memory as state information for the re-initialized process and to be associated with the resource.

14 Claims, 16 Drawing Sheets

(56) References Cited

U.S. PATENT DOCUMENTS

| | | | |
|---|---|---|---|
| 5,634,124 A * | 5/1997 | Khoyi et al. | 1/1 |
| 5,721,876 A * | 2/1998 | Yu et al. | 703/27 |
| 5,742,817 A * | 4/1998 | Pinkoski | 1/1 |
| 5,946,189 A | 8/1999 | Koenen et al. | |
| 6,085,217 A * | 7/2000 | Ault et al. | 718/105 |
| 6,098,112 A | 8/2000 | Ishijima et al. | |
| 6,145,088 A * | 11/2000 | Stevens | 714/2 |
| 6,160,554 A | 12/2000 | Krause | |
| 6,304,945 B1 | 10/2001 | Koenen | |
| 6,349,035 B1 | 2/2002 | Koenen | |
| 6,415,333 B1 * | 7/2002 | Vasell | 719/315 |
| 6,424,621 B1 | 7/2002 | Ramaswamy et al. | |
| 6,438,130 B1 | 8/2002 | Kagan et al. | |
| 6,484,224 B1 | 11/2002 | Robins et al. | |
| 6,502,203 B2 | 12/2002 | Barron et al. | |
| 6,530,007 B2 | 3/2003 | Olarig et al. | |
| 6,560,613 B1 | 5/2003 | Gylfason et al. | |
| 6,667,918 B2 | 12/2003 | Leader et al. | |
| 6,687,762 B1 | 2/2004 | Van Gaasbeck et al. | |
| 6,687,849 B1 * | 2/2004 | Cherf | 714/5.1 |
| 6,718,392 B1 | 4/2004 | Krause | |
| 6,728,743 B2 | 4/2004 | Shachar | |
| 6,732,211 B1 * | 5/2004 | Goyal et al. | 710/261 |
| 6,735,642 B2 | 5/2004 | Kagan et al. | |
| 6,768,996 B1 | 7/2004 | Steffens et al. | |
| 6,785,888 B1 | 8/2004 | McKenney et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,688,853 B2 | 3/2010 | Santiago et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0152226 A1 * | 10/2002 | Burnett | 707/200 |
| 2002/0156784 A1 | 10/2002 | Hanes et al. | |
| 2003/0007165 A1 | 1/2003 | Hudson | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0172330 A1 | 9/2003 | Barron et al. | |
| 2003/0182465 A1 | 9/2003 | Moir et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0210906 A1 | 10/2004 | Beresnevichiene et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0188351 A1 | 8/2007 | Brown et al. | |
| 2007/0220183 A1 | 9/2007 | Kagan et al. | |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smelloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |

(56) References Cited

U.S. PATENT DOCUMENTS

| | | | |
|---|---|---|---|
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |

FOREIGN PATENT DOCUMENTS

| | | |
|---|---|---|
| EP | 2272214 | 1/2011 |
| WO | 0148972 | 7/2001 |
| WO | 0235838 | 5/2002 |
| WO | 2008127672 | 12/2008 |
| WO | 2009136933 | 11/2009 |
| WO | 2010020907 | 7/2010 |
| WO | 2010087826 | 8/2010 |
| WO | 2011043768 | 4/2011 |
| WO | 2011053305 | 5/2011 |
| WO | 2011053330 | 5/2011 |

OTHER PUBLICATIONS

Marc E. Fiuczynski, et al. "Spine Reports, Talks, Papers", http://www.cs.princeton.edu/~mef/research/spine/reports/sigops98/index.html, May 19, 2006, 10 pages.

Hermann Hellwagner, Josef Weidendorfer, "SCI Sockets Library", http://www.itec.uni-klu.ac.at/, http://wwwbodes.in.tum.de/, 20 pages.

Kevin Fall, et al., "Improving Continuous-Media Playback Performance with In-Kernel Data Paths", 0-8186-5530-5/94, © 1994 IEEE, pp. 100-109.

Maged M. Michael, et al., "Relative Performance of Preemption-Safe Locking and Non-Blocking Synchronization on Multiprogramm3ed Shared Memory Multiprocessors", 1063-7133/97, © 1997 IEEE, pp. 267-273.

Maged M. Michael, "Hazard Pointers: Safe Memory Reclamation for Lock-Free Objects", IEEE Transactions on Parallel and Distributed Systems, vol. 15, No. 6, Jun. 2004, pp. 491-504.

Tom Zanussi, et al., "relayfs: An Efficient Unified Approach for Transmitting Data from Kernel to User Space", Linux Symposium 2003, pp. 519-532.

Hewlett Packard, "HP-UX Route Administration Manager (ramD)", Dec. 2003, pp. 1-10.

Cramming more components onto integrated circuits, Electronics, vol. 38, No. 8, pp. 114-117, 1965, Gordon E. Moore, Apr. 19, 1965.

Programming Semantics for Multiprogrammed Computations, Communications of the ACM, vol. 9, No. 3, pp. 143-155, Jack B. Dennis and Earl C. Van Horn, Mar. 1966.

The Aloha System, ACM Computer Communication Review, vol. 4 No. 1, F.F. Kuo, Jan. 1974.

A Protocol for Packet Network Intercommunication, IEEE Transactions on Communications, vol. COM-22, No. 5, pp. 637-648, Vinton Cerf, Robert Kahn, May 1974.

Proposal for an International End-to-End Protocol, ACM Computer Communication Review, vol. 6 No. 1, p. 1-18, V. Cerf, et al., Jan. 1976.

Ethernet: distributed packet switching for local computer networks, Communications of the ACM, vol. 19, Issue 7, pp. 395-404, Robert M. Metcalfe and David R. Boggs, Jul. 1976.

Interrupt Driven Programming, Communications of the ACM, vol. 14, No. 6, p. 417-418, Marvin Zelkowits, Jun. 1971.

Synchronizing Processors with Memory-Content-Generated Interrupts, Communications of the ACM, vol. 16, No. 6, p. 350-351, J. Carver Hill, Jun. 1973.

Virtual cut-through: A new computer communication switching technique, Computer Networks, vol. 3, No. 4, pp. 267-286, P. Kermani and L. Kleinrock, Sep. 1979.

An Overview of the New Routing Algorithm for the ARPANET, Proceedings of the 6th Data Communications Symposium, p. 63, John M. McQuillan, et al., Nov. 1979.

Grapevine: An Exercise in Distributed Computing, Communications of the ACM, vol. 25, Issue 4, pp. 260-274, Andrew D. Birrell, et al., Apr. 1982.

The Architecture of the Universe Network, ACM Computer Communication Review, vol. 14, No. 2, pp. 2-9, Ian M. Leslie, et al., Jun. 1984.

Congestion Control in IP/TCP Internetworks, ACM Computer Communication Review, vol. 14, No. 4, p. 11-17, John Nagle, Oct. 1984.

Development of a TCP/IP for the IBM/370, ACM Computer Communication Review, vol. 15, No. 4, Robert M. Brandriff, et al., Sep. 1985.

Supercomputers on the Internet: A Case Study, ACM Computer Communication Review, vol. 17, No. 5, C. Kline, Aug. 1987.

Fragmentation Considered Harmful, ACM Computer Communication Review, vol. 17, No. 5, pp. 390-401, Christopher A. Kent, Jeffrey C. Mogul, Oct. 1987.

An Analysis of Memnet: An Experiment in High-Speed Shared-Memory Local Networking, ACM Computer Communication Review, vol. 18, No. 4, p. 165-174, Gary S. Delp, et al., Aug. 1988.

Measured Capacity of an Ethernet: Myths and Reality, ACM Computer Communication Review, vol. 18, No. 4, p. 222-234, David R. Boggs, et al., Aug. 1988.

The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.

Congestion Avoidance and Control, ACM Computer Communication Review, vol. 18, No. 4, p. 314-329, V. Jacobson, Aug. 1988.

The Design Philosophy of the DARPA Internet Protocols, ACM Computer Communication Review, vol. 18, No. 4, pp. 106-114, David D. Clark, Augus 1988.

Development of the Domain Name System, ACM Computer Communication Review, vol. 18, No. 4, pp. 123-133, Paul V. Mockapetris and Kevin J. Dunlap, Augus 1988.

Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.

Implementing TCP/IP on a Cray computer, ACM Computer Communication Review, vol. 19, No. 2, p. 11-15, David A. Borman, Apr. 1989.

Computing the Internet Checksum, ACM Computer Communication Review, vol. 19, No. 2, p. 86-94, R. Braden, et al., Apr. 1989.

An Analysis of TCP Processing Overhead, IEEE Communications Magazine, vol. 27, No. 6, pp. 23-29, David D. Clark, et al., Jun. 1989.

Sirpent: A High-Performance Internetworking Approach, ACM Computer Communication Review, vol. 19, No. 4, p. 158-169, David R. Cheriton, Sep. 1989.

Protocol Design for High Speed Networks, PhD Thesis, University of Cambridge, Derek Robert McAuley, Sep. 1989.

How Slow Is One Gigabit Per Second?, ACM Computer Communication Review, vol. 20, No. 1, p. 44-53, Craig Partridge, Jan. 1990.

Architectural Considerations for a New Generation of Protocols, ACM Computer Communication Review, vol. 20, No. 4, pp. 200-208, D. D. Clark and D. L. Tennenhouse, Sep. 1990.

Protocol Implementation on the Nectar Communication Processor, ACM Computer Communication Review, vol. 20, No. 4, p. 135-144, Eric C. Cooper, et al., Sep. 1990.

A Host-Network Interface Architecture for ATM, ACM Computer Communication Review, vol. 21, No. 4, Bruce S. Davie, Sep. 1991.

A High-Performance Host Interface for ATM Networks, ACM Computer Communication Review, vol. 21, No. 4, p. 317-325, C. Brendan S. Traw, Sep. 1991.

Fairisle: An ATM Network for the Local Area, ACM Computer Communication Review, vol. 21, No. 4, p. 327, Ian Leslie and Derek R. McAuley, Sep. 1991.

The Desk Area Network, ACM Operating Systems Review, vol. 25, Issue 4, p. 14-21, Mark Hayter and Derek McAuley, Oct. 1991.

An Integration of Network Communication with Workstation Architecture, ACM Computer Communication Review, vol. 21, No. 5, p. 18-29, 1991.

The Evolution of XTP, Proceedings of the Third International Conference on High Speed Networking,. Greg Chesson. Nov. 1991.

System support for multi-service traffic, University of Cambridge Computer Laboratory Technical Report No. 245, Michael J. Dixon, Jan. 1992.

(56) References Cited

OTHER PUBLICATIONS

ATOMIC: A Local Communication Network Created Through Repeated Application of Multicomputing Components, Made available by authors, Danny Cohen, Gregory Finn, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.
Giving Applications Access to Gb/s Networking, IEEE Network, vol. 7, Issue 4, pp. 44-52, Jonathan M. Smith and C. Brendan S. Traw, Jul. 1993.
The Design and Evaluation of an Off-Host Communications Protocol Architecture, MSci Thesis, University of Virginia, Jeffrey R. Michel, Aug. 1993.
A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 817, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 2435, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of A Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing A High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Devices in a Multi-Service Operating System, PhD Thesis, University of Cambridge, Paul Ronald Barham, Jul. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: a Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.

(56) References Cited

OTHER PUBLICATIONS

An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Characterizing Processor Architectures for Programmable Network Interfaces, Proceedings of the 14th international conference on Supercomputing, pp. 54-65, Santa Fe, New Mexico, Patrick Crowley, et al., May 8, 2000.
When the CRC and TCP Checksum Disagree, ACM Computer Communication Review, vol. 30, No. 4, pp. 309-319, Jonathan Stone and Craig Partridge, Oct. 2000.
The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.
Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.
Arsenic: A User-Accessible Gigabit Ethernet Interface, Proceedings of IEEE Infocom 2001, pp. 67-76, Ian Pratt and Keir Fraser, Apr. 22, 2001.
Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.
Presentation given at HOTI'01, 9th Symposium on High Performance Interconnects, Bilic Hrvoye, et al., Aug. 22, 2001.
Topology Discovery for Large Ethernet Networks, ACM Computer Communication Review, vol. 31, No. 4, Bruce Lowekamp, et al., Oct. 2001.
EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.
A Case Study in Application I/O on Linux Clusters, Proceedings of the 2001 ACM/IEEE conference on Supercomputing, pp. 11, Denver, Robert Ross, et al., Nov. 10, 2001.
On Making TCP More Robust to Packet Reordering, ACM Computer Communication Review, vol. 32, No. 1, E. Blanton and M. Allman, Jan. 2002.
TCP Servers: Offloading TCP Processing in Internet Servers. Design, Implementation, and Performance, Technical Report DCR-TR-481, Computer Science Department, Rutgers University, Murali Rangarajan, et al., Mar. 2002.
ATM: A Retrospective on Systems Legacy, ACM Computer Communication Review, vol. 32, No. 5, Jon Crowcroft and Derek McAuley, Nov. 2002.
A Retrospective View of ATM, ACM Computer Communication Review, vol. 32, No. 5, pp. 13-19, Charles Kalmanek, Nov. 2002.
The Influence of ATM on Operating Systems, ACM Computer Communication Review, vol. 32, No. 5, pp. 29-37, Jonathan Smith, Nov. 2002.
An Overview of the BlueGene/L Supercomputer, Proceedings of the 2002 ACM/IEEE conference on Supercomputing, pp. 1-22, Baltimore, NR Adiga, et al., Nov. 16, 2002.
Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.
Some Internet Architectural Guidelines and Philosophy, IETF Network Working Group, Request for Comments: 3439, R. Bush, D. Meyer, Dec. 2002.
F—RTO: An Enhanced Recovery Algorithm for TCP Retransmission Timeouts, ACM Computer Communication Review, vol. 33, No. 2, Pasi Sarolahti, et al., Apr. 2003.
Scalable TCP: Improving Performance in Highspeed Wide Area Networks, ACM Computer Communication Review, vol. 33, No. 2, pp. 83-91, Tom Kelly, Apr. 2003.
TCP offload is a dumb idea whose time has come, Proceedings of HotOS IX: The 9th Workshop on Hot Topics in Operating Systems, pp. 25-30, Jeffrey C. Mogul, May 18, 2003.
A case for Virtual Channel Processors, Proceedings of the ACM SIGCOMM 2003 Workshops, Derek McAuley and Rolf Neugebauer, Aug. 2003.
Initial End-to-End Performance Evaluation of 10-Gigabit Ethernet, Proceedings of the 11th Symposium on High Performance Interconnects, Justin Hurwitz and Wu-chun Feng, Aug. 20, 2003.
Workshop on network-I/O convergence: experience, lessons, implications (NICELI), ACM Computer Communication Review, vol. 33, No. 5, Vinay Aggarwal, et al., Oct. 2003.
Optimizing 10-Gigabit Ethernet for Networks of Workstations, Clusters, and Grids: A Case Study, Proceedings of the 2003 ACM/IEEE conference on Supercomputing, Phoenix, Arizona, Wu-chun Feng, et al., Nov. 15, 2003.
Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.
Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.
FAST TCP: Motivation, Architecture, Algorithms, Performance, Proceedings of IEEE Infocom, pp. 1246-1259, Cheng Jin, et al., Mar. 7, 2004.
TCP Offload to the Rescue, ACM Queue, vol. 2, No. 3, Andy Currid, May 1, 2004.
TCP Onloading for Data Center Servers, Computer, IEEE Computer Society, vol. 37, No. 11, pp. 48-58, Greg Regnier, et al., Nov. 2004.
Declaration of Dr Gregory L Chesson in Alacritech v. Microsoft, United States District Court, Northern District California, San Francisco Division, Gregory L. Chesson, Feb. 4, 2005.
Computing Research: A Looming Crisis, ACM Computer Communication Review, vol. 35, No. 2, Edward D. Lazowska and David A. Patterson, Jul. 2005.
Performance Characterization of a 10-Gigabit Ethernet TOE, Proceedings of the 13th Symposium on High Performance Interconnects, W. Feng, et al., Aug. 17, 2005.
User-level device drivers: Achieved performance, J. Comput. Sci. & Technol., vol. 20, B. Leslie, et al., Sep. 2005.
Head-to-TOE Evaluation of High-Performance Sockets Over Protocol Offload Engines, Proceedings of the IEEE International Conference on Cluster Computing, P. Balaji, et al., Sep. 2005.
SCTP versus TCP for MPI, Proceedings of the 2005 ACM/IEEE conference on Supercomputing, Seattle, p. 30, Washington, Humaira Kamal, et al., Nov. 12, 2005.

(56) References Cited

OTHER PUBLICATIONS

LTCP: Improving the Performance of TCP in Highspeed Networks, ACM Computer Communication Review, vol. 36, No. 1, pp. 41-50, Sumitha Bhandarkar, et al., Jan. 2006.

Zero-Copy TCP in Solaris, Proceedings of the USENIX Annual Technical Conference, H. K. Jerry Chu, Jan. 1996.

Reflections on Network Architecture: an Active Networking Perspective, ACM Computer Communication Review, vol. 36, No. 2, pp. 27-30, Ken Calvert, Apr. 2006.

10 Networking Papers: Recommended Reading, ACM Computer Communication Review, vol. 36, No. 2, pp. 51-52, Jon Crowcroft, Apr. 2006.

Flow labelled IP over ATM: design and rationale, ACM Computer Communication Review, vol. 36, No. 3, pp. 79-92, Greg Minshall, et al., Jul. 2006.

10 Networking Papers: Readings for Protocol Design, ACM Computer Communication Review, vol. 36, No. 3, pp. 77-78, David Wetherall, Jul. 2006.

A Critique of RDMA, HPCWire article: http://www.hpcwire.com/features/17886984.html,Patrick Geoffray, Aug. 18, 2006.

The NE010 iWARP Adapter, Open Fabrics Alliance, Gary Montry, May 2006.

Protocol Onload vs. Offload, Intel, Greg Regnier, Date Unknown.

Protocol Onloading vs. Offloading in High Performance Networks, Pacific Northwest Laboratories by Batelle for the U.S. Department of Energy, Fabrizio Petrini, Date Unknown.

Thoughts about TCP Offloading, My 2003 HotOS paper title: TCP Offload is a dumd idea whose time has to come, HP Labs (Not speaking for HP), Jeff Mogul, Aug. 2006.

Protocol Offloading vs. Onloading in High Performance Networks, Hot Interconnect Panel, System Interconnect Group, Qlogic Corporation, Lloyd Dickman CTO, Aug. 23, 2006.

Protocol off-loading vs. on-loading in high performance networks, Hot Interconnects, Myricom®, Patrick Geoffray, 2006.

Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.

High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.

10Gb/s Ethernet Performance and Retrospective, ACM Computer Communication Review, vol. 37, No. 2, pp. 89-92, Steven Pope and David Riddoch, Mar. 19, 2007.

Getting 10 Gb/s from Xen, Euro-Par Conference 2007, pp. 224-233, Rennes, France, Kieran Mansley, et al., Aug. 28, 2007.

The Parallel Protocol Engine, IEEE/ACM Transactions in Networking vol. 1, Issue 6, pp. 650-663, M. Kaiserswerth, Dec. 1993.

Use of message-based multicomputer components to construct gigabit networks, ACM Computer Communication Review, vol. 23, No. 4, p. 32-44, Danny Cohen, et al., Jul. 1993.

The End of History, IEEE TCGN Gigabit Networking Workshop, J. Evans and T. Buller, Apr. 22, 2001.

The Cambridge Model Distributed System, ACM SIGOPS Operating Systems Review, vol. 14, Issue 1, pp. 21-29, M.V. Wilkes and R.M. Needham, Jan. 1980.

* cited by examiner

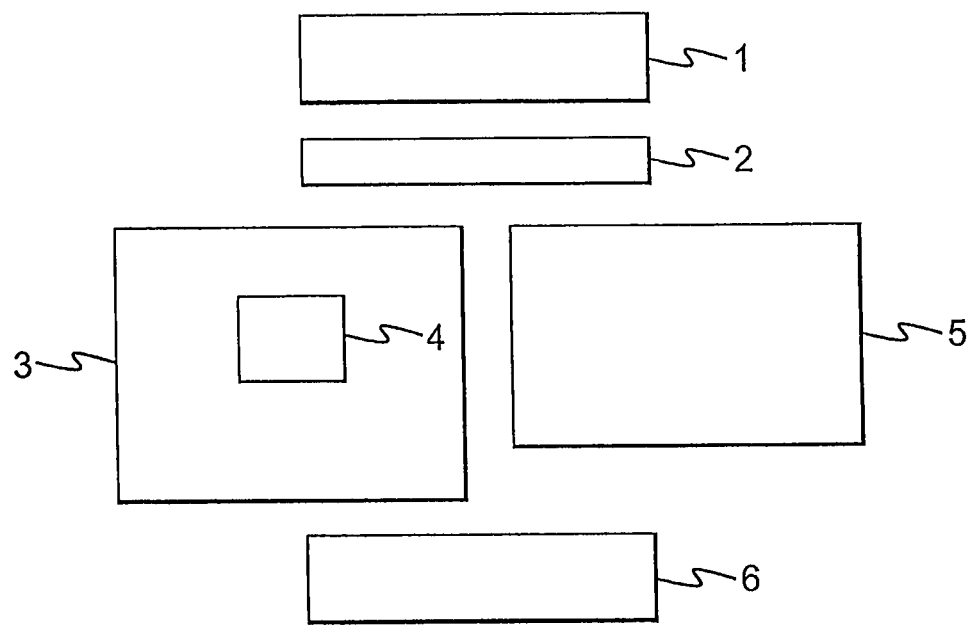

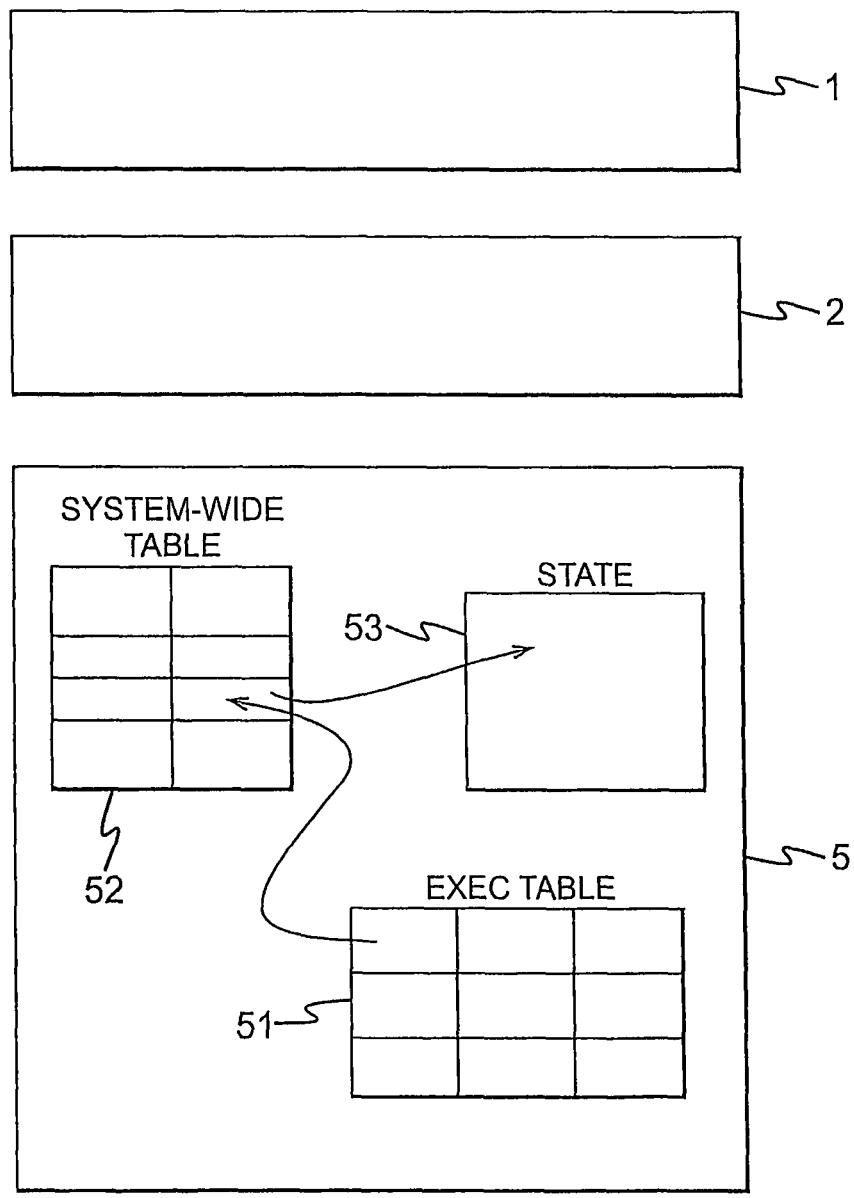

| DATA | TCP ADD. | IP ADD. | ETH. ADD. |
|------|----------|---------|-----------|
| 14 | 13 | 12 | 11 |

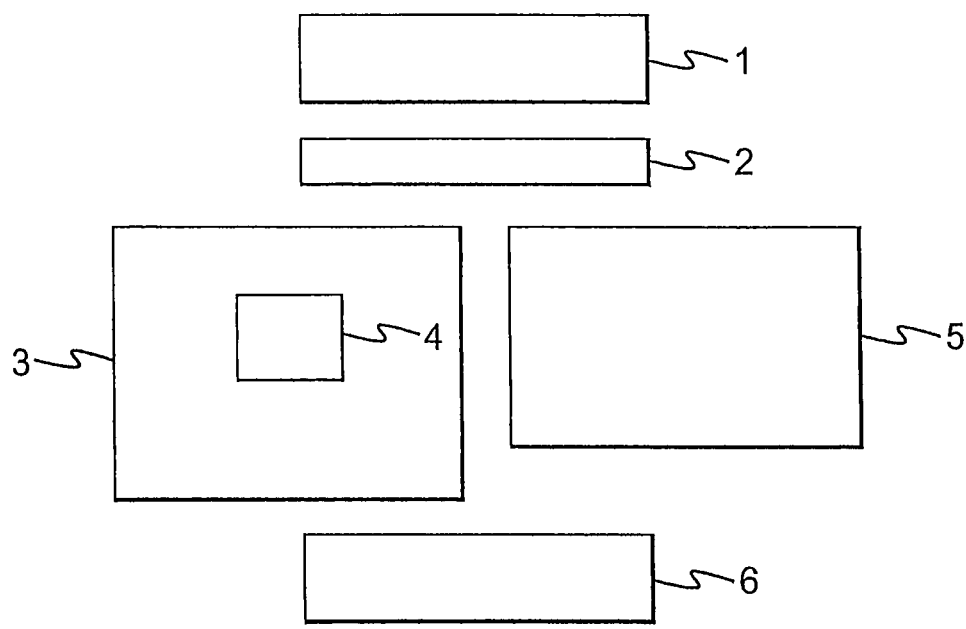

| DESCRIPTOR | L5 |
|---|---|
| 0 | ✓ |
| 3 | ? |
| 4 | X |
| 6 | ? |

40

USER-LEVEL RE-INITIALIZATION INSTRUCTION INTERCEPTION

PRIOR APPLICATION DATA

This application claims priority to PCT Application No. PCT/GB2006/000852, entitled Data Processing System which was published as WO 2006/095184 which is based on and claims priority to Great Britain patent application number 0504987.9 filed Mar. 10, 2005; Great Britain patent application number 0505299.8 filed Mar. 15, 2005; Great Britain application number 0505300.4 filed Mar. 15, 2005; Great Britain application number 050297.2 filed Mar. 15, 2005; and Great Britain patent application number 0506403.5 filed Mar. 30, 2005. The claims after preliminary amendment claim priority to Great Britain patent application number 0505299.8 filed Mar. 15, 2005.

FIELD OF THE INVENTION

This disclosure relates to data processing systems.

RELATED ART

In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. Existing data processing system suffer from various drawbacks in this regard.

In addition, in order to transmit data between data processors in a network such as an Ethernet network, data is formed into packets. Each packet includes a header specifying the destination of the data in the packet. In an Ethernet network the destination is typically specified by means of an Ethernet address, an Internet Protocol (IP) address and a Transmission Control Protocol (TCP) address.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Layers of the stack include an application and a socket provided by a socket library. The socket library is an application program interface (API) for building software applications. The socket library can carry out various functions, including creating descriptors and storing information. Additionally, there is an operating system (OS) comprising a TCP kernel and a proprietary TCP user-level stack.

In order to perform routing the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network. This is a drawback to the prior art.

It is further known that In computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below.

Multiple threads can exist within a single application process and can execute concurrently with access to all the memory of the application context. Thus, there may be multiple threads within each application wishing to access the shared memory. If more than one process or thread were permitted concurrent access to the memory then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory, the lock associated with the memory will enter a locked state, indicating that the memory cannot currently be accessed by other threads. When another thread (T) makes an attempt to access the memory while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space while it is being used can cause an entry to be added to a queue so as to indicate that the threads are awaiting access to the memory. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications.

It is also known for an application, on releasing a lock, to send a system call (syscall) to a driver within the operating system to initiate the sending of a wake-up call to waiting applications. The driver on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

Various embodiments are disclosed herein for overcoming the drawbacks in the prior art and for providing additional advantages and benefits for data processing systems and the methods associated therewith.

SUMMARY

To overcome the drawbacks of the prior art and provide additional benefits and features, A data processing system is disclosed. In one embodiment the system comprises an operating system for supporting processes such that each process is associated with one or more resources. The operating system is arranged to police the accessing by processes of resources so as to inhibit a process from accessing resources with which it is not associated, and being responsive to instructions of a certain type to re-initialize a process. Also part of this embodiment is an interface for interfacing between each process and the operating system. A memory is provided for storing state information for at least one process such that the state information is associated with a resource. In addition, the interface is arranged to analyze instructions from the processes to the operating system, upon detecting an instruction to re-initialize a process so as to be associated with a resource that is associated with pre-existing state information. This causes state information corresponding to that pre-existing state information to be stored in the memory as state information for the re-initialized process and to be associated with the resource.

Also disclosed herein is a data processing system comprising an operating system that stores a first network routing table that comprises one or more entries each indicating at least part of a route over a network to a respective destination. This system also comprises a transmission support function arranged to maintain a copy of the first network routing table and a network data transmission function arranged to transmit data in accordance with the copy network routing table and without accessing the first network routing table.

In one embodiment, a data processing system is arranged to control access by a plurality of processes to a region of shared memory. In such an embodiment, the data processing system is configured to prevent more than one process from concurrently accessing the region of shared memory and establish a data structure for holding items of a first type. These each comprise an indication of another of the plurality of processes, which are attempting to access the region of shared memory, and a definition of an operation on the region of shared memory. In addition, on a process finishing accessing the region of shared memory, action an item in the data structure by performing the defined operation by other than the process indicated in that item.

Also disclosed herein is a data processing system comprising an operating system for supporting processes such that the operating system is arranged to output data by addressing the data to a descriptor corresponding to the intended destination of the data. Also part of this embodiment is an interface for interfacing between each process and the operating system. A memory is provided including one or more address spaces and there is an address space corresponding to each of the processes for use by the respective process. Also, a data communication stack is provided or created for one of the processes such that the stack is located in the address space corresponding to the respective process and having a descriptor allocated to it. In this embodiment, the interface is arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

Also disclosed herein is a method of compiling a data structure in a computer system such that the computer system is arranged to perform protocol processing and transmit data via an interface on the basis of instructions in accordance with a route. In one embodiment this method comprises receiving a first instruction including an indication of a descriptor and determining a route indicated by the first instruction. This method also identifies an interface within the determined route and attempts to determine the ownership of the interface. As a result, this method causes an entry to be made in the data structure such that the entry includes an identifier of the descriptor and a state of the descriptor, wherein the state represents the result of the attempting step.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3 shows a computer system in accordance with embodiments of the present invention.

FIG. 4 shows a descriptor table.

FIG. 5 shows an arrangement of tables in accordance with an embodiment of the present invention.

FIG. 15 shows a computer system in accordance with embodiments of the present invention.

FIG. 16 shows a descriptor table.

DETAILED DESCRIPTION

Figure 1:
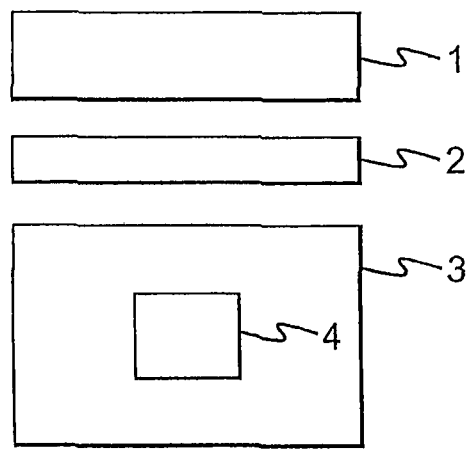
FIG. 1 shows a prior art computer system.

The present application relates to data processing systems and it may assist the reader to know the following five sections set forth herein. These sections are Forking Applications, Routing Tables, Memory Access, Intercepting Instructions, and Transmitting Data. Although the Drawing associated with this disclosure are shared by the entire disclosure, FIG. 1 to 6 relate to the description in section Forking Applications, FIGS. 7 to 9 relate to the description in section Routing Tables, FIGS. 10 to 12 relate to the description in section Memory Access, FIGS. 13 to 19 relate to the description in section Intercepting Instructions, and FIGS. 20 to 24 relate to the description in section Transmitting Data.

The embodiments of each of the inventions described herein may include any one or more of the features described in relation to the other inventions. As such various different embodiments may be configured with any element, feature, or step, disclosed herein, either alone or in combination. Where reference numerals are used in a section of the description they refer only to the figure(s) that relate to the description in that section.

Forking Applications

This invention relates to processing instructions in computer systems, and especially to the processing of fork and exec system calls within a user level network architecture.

In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

FIG. 1 represents equipment capable of implementing a prior art protocol stack, such as a transmission control protocol (TCP) stack in a computer connected to a network. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network.

Syscalls can be thought of as functions taking a series of arguments which cause execution of the CPU to switch to a privileged level and start executing the operating system. Here the syscalls are denoted 1 to N. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

When a network related application program interface (API) call is made through the socket library this causes a system call to be made, which creates (or opens) a new file descriptor. For example the accept( ) system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table (described in more detail below with reference to FIG. 5) which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. An alternative architecture is a user-level architecture, as described in the applicant's copending applications WO 2004/079981 and WO 2005/104475. In a user-level architecture at least some of the functions usually performed by the operating system are performed by code running at user level. In a user-level architecture at least some of the state of the function can be stored by the user-level code. This can cause difficulties when an application performs an operation that requires the operating system to interact with or have knowledge of that state.

In embodiments of the present invention syscalls passing through the socket can be analysed to establish the file descriptor and any information identified in the syscall that indicates the path by which the syscall is to be directed, and decisions can thereby be made by the socket so that the syscall can be transmitted in a suitable way from the socket.

An example of a syscall is Dup2($a,b$), which has the effect of duplicating the file or other resource represented by descriptor "a" and creating a new resource represented by descriptor "b" and having the same properties. One example of when such a call might be useful is when a descriptor that has a system-wide significance (for example the descriptor that maps on to error output—commonly descriptor #2) is to be redirected on to some other file or device.

Other examples of syscalls are fork( ) and exec( ). A fork( ) call typically creates a new process (child) from the old one (parent) which initially shares all state including memory mappings and file-descriptors. After a successful fork( ), two copies of the original code will be running. An exec( ) call can then be requested to re-initialise the child process. This will replace the current process image with a new process image, but details of the child process can be preserved. For example, an exec( ) call can specify that particular file descriptors that are in use by the parent process are to be preserved in the child and (often) subsequently closed by the parent; thus handing over control of those file descriptors from the parent to the new child process. More generally exec( ) calls, or other similar instructions, can specify the location of the new image, command line arguments, environment variables and file descriptors with which the new process image can be started.

According to a first aspect of the present invention there is provided a data processing system comprising: an operating system for supporting processes, each process being associated with one or more resources, the operating system being arranged to police the accessing by processes of resources so as to inhibit a process from accessing resources with which it is not associated, and being responsive to instructions of a certain type to re-initialise a process; an interface for interfacing between each process and the operating system; and a memory for storing state information for at least one process, the state information being associated with a resource; the interface being arranged to analyse instructions from the processes to the operating system, and being arranged to, on detecting an instruction to re-initialise a process so as to be associated with a resource that is associated with pre-existing state information, cause state information corresponding to that pre-existing state information to be stored in the memory as state information for the re-initialised process and to be associated with the resource. The instructions could suitably include exec( ) instructions.

Preferably the interface is arranged to, when two or more resources are associated with the process, to cause the state information corresponding to the pre-existing state information to be associated with the resource in response to an attempt to access the resource.

The operating system is suitably responsive to instructions of another type to duplicate a process. The instructions of another type could suitably by fork( ) instructions.

Preferably the resource with which the state information is associated is a memory area storing data for transmission and/or reception by the data processing system.

The state information is preferably one or more of: data transmission information, reception state information, information defining a virtual hardware interface, TCP windows, information defining unacknowledged buffers and information defining timeout values.

The system may be arranged to be capable of using the state information to form a memory mapping onto the resource. The operating system could have a table indicating which state information is associated with which resource.

The interface is preferably arranged to, on detecting an instruction to re-initialise a process so as to be associated with a resource that is associated with pre-existing state information, store a record of that instruction and then pass the instruction to the operating system.

The operating system may be arranged to call the interface to configure state information for a re-initialised process, and the interface is arranged to, on being called to configure state information for a process to check whether it has a record of there having been an instruction to re-initialise that process so as to be associated with a resource that is associated with pre-existing state information; and if so, cause state information corresponding to that pre-existing state information to be stored in the memory as state information for the process and to be associated with the resource, and otherwise generate fresh state information for the process.

Each resource is suitably identifiable by means of a file descriptor. A resource can preferably be identifiable by multiple file descriptors.

The operating system is preferably arranged to, in response to instructions to re-initialise a process and allocate a new file descriptor to that process, preferentially allocate a new resource to that process, identifiable by the new file descriptor.

The state information is suitably stored in memory that is shared between the operating system and the interface. The interface could be a library, and it could be an application program interface.

According to a second aspect of the present invention there is provided an interface for use by a data processing system comprising an operating system for supporting processes, each process being associated with one or more resources, the operating system being arranged to police the accessing by processes of resources so as to inhibit a process from accessing resources with which it is not associated, and being responsive to instructions of a certain type to re-initialise a process and a memory for storing state information for at least one process, the state information being associated with a resource; the interface being for interfacing between each process and the operating system; and being arranged to analyse instructions from the processes to the operating system, and being arranged to, on detecting an instruction to re-initialise a process so as to be associated with a resource that is associated with pre-existing state information, cause state information corresponding to that pre-existing state information to be stored in the memory as state information for the re-initialised process and to be associated with the resource.

According to a third aspect of the present invention there is provided a data carrier storing program data defining an interface as defined above.

According to a fourth aspect of the present invention there is provided a method for processing instructions in a data processing system comprising: an operating system for supporting processes, each process being associated with one or more resources, the operating system being arranged to police the accessing by processes of resources so as to inhibit a process from accessing resources with which it is not associated, and being responsive to instructions of a certain type to re-initialise a process; an interface for interfacing between each process and the operating system; and a memory for storing state information for at least one process, the state information being associated with a resource; the method comprising the steps of: analysing instructions from the processes to the operating system; and on detecting an instruction to re-initialise a process so as to be associated with a resource that is associated with pre-existing state information, causing state information corresponding to that pre-existing state information to be stored in the memory as state information for the re-initialised process and to be associated with the resource.

Figure 6:
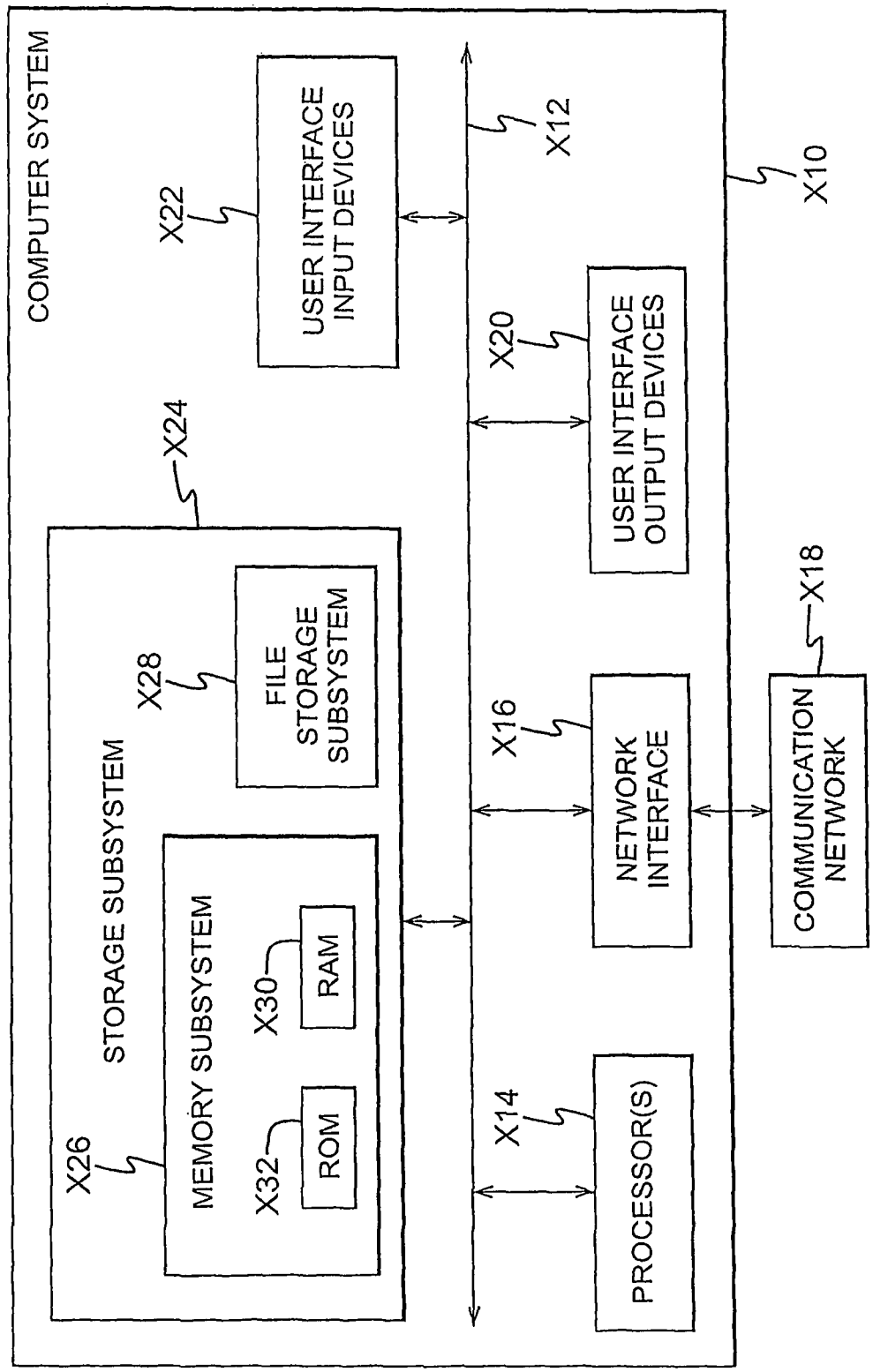
FIG. 6 shows hardware suitable for use with embodiments of the invention.

FIG. 6 is a simplified block diagram of a computer system X10 suitable for use with embodiments of the present invention. Computer system X10 typically includes at least one processor X14 which communicates with a number of peripheral devices via bus subsystem X12. These peripheral devices may include a storage subsystem X24, comprising a memory subsystem X26 and a file storage subsystem X28, user interface input devices X22, user interface output devices X20, and a network interface subsystem X16. The input and output devices allow user interaction with computer system X10. Network interface subsystem X16 provides an interface to outside networks, including an interface to communication network X18, and is coupled via communication network X18 to corresponding interface devices in other computer systems. Communication network X18 may comprise many interconnected computer systems and communication links. These communication links may be wireline links, optical links, wireless links, or any other mechanisms for communication of information. While in one embodiment, communication network X18 is the Ethernet, in other embodiments, communication network X18 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices X22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system X10 or onto computer network X18.

User interface output devices X20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system X10 to the user or to another machine or computer system.

Storage subsystem X24 stores the basic programming and data constructs that provide the functionality of certain embodiments of the present invention. For example, the various modules implementing the functionality of certain embodiments of the invention may be stored in storage subsystem X24. These software modules are generally executed by processor X14.

Memory subsystem X26 typically includes a number of memories including a main random access memory (RAM) X30 for storage of instructions and data during program execution and a read only memory (ROM) X32 in which fixed instructions are stored. File storage subsystem X28 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem X28. A host memory contains, among other things, computer instructions which, when executed by a processor subsystem, cause the computer system to operate or perform functions as described herein.

Bus subsystem X12 provides a mechanism for letting the various components and subsystems of computer system X10 communicate with each other as intended. Although bus subsystem X12 is shown schematically as a single bus, alternative embodiments of the bus subsystem may use multiple busses.

Computer system X10 itself can be of varying types including a personal computer, a portable computer, a workstation, a computer terminal, a network computer, a television, a mainframe, or any other data processing system or user device. Due to the ever-changing nature of computers and networks, the description of computer system X10 depicted in FIG. 6 is intended only as a specific example for purposes of illustrating the preferred embodiments of the present invention. Many other configurations of computer system X10 are possible having more or less components than the computer system depicted in FIG. 6.

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral device must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

FIG. 3 shows components implementing a TCP stack for use in accordance with embodiments of the present invention. Layers of the stack include an application 1 and a socket 2 provided by a socket library. In general, a library is a collection of routines. The term is commonly used to refer to a collection of standard programs and routines that can be used by processes running in a computer system. In the context of FIG. 3, a socket library is an application program interface (API) for building software applications. The socket library can carry out various functions, including creating descriptors and storing information. Additionally, there is an operating system 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 3. The hardware could be a network interface card (NIC).

In this arrangement there can be one user-level TCP stack 5 for each application that requires one. This can provide better performance than if a stack is shared between applications. Each stack is located in the same address space as the application that it serves. In alternative implementations, multiple applications can use a single stack, or a stack could be split so that there are multiple stacks per application if necessary.

The socket library maintains a table 40, shown in FIG. 4, incorporating identifiers of file descriptors and their ownership. In general, the term ownership applies to control of access to elements within a computer system. For example, a network interface 6 (typically a port on a network interface card) could link a data processing system to a series of other computers, and the data processing system could be similarly linked by a further network interface to another series of computers. If it is desired to send a packet of data from the data processing system to a specific one of the computers, the correct network interface must be selected in order to successfully transmit the packet to the correct computer. In this case, the term "ownership" refers to the identity of the interfaces. Thus "ownership" can refer to the allocation of a resource to an entity such as a process or a stack, which may imply that access to that resource is limited to that entity. It is used in this general sense herein, and in some embodiments of the invention the term "owner" can refer more specifically to the process that has responsibility for managing a resource associated with a file descriptor. Ownership of a file descriptor by a stack can refer to the responsibility that the stack has for performing operations on behalf of a process indicating that file descriptor in instructions sent by the process. Resources could suitably include memory, protocol processing stacks, data structures, NICs and NIC drivers.

In embodiments of the invention, the right of a process to access a resource is defined by the allocation (or ownership) of file descriptors. A file descriptor can be allocated by the OS to a process. The file descriptor is typically associated with a particular resource or a plurality of resources. By allocating the file descriptor to the process, access to the corresponding resources by the process is enabled. Ownership of a file descriptor by a process, and thus access to the resource or resources corresponding to the descriptor, may (although need not) imply unique access of the process to the resource (s). For example, a process may own a file descriptor identifying an established communication channel to a remote computer. The file descriptor may be the only file descriptor in the data processing system that is assigned to that communication channel. The OS may be configured to deny ownership of that file descriptor to any other processes concurrently, thereby providing sole access of the communication channel to the process. However, in other embodiments, multiple processes may be provided with concurrent ownership of the same file descriptor.

In the present example illustrated by FIG. 3, the computer system has a kernel (K) 4 and a proprietary user-level stack 5 which will be referred to (by way of example only) as a Level 5 (or L5) stack. The L5 stack is associated with its own library which is interposed in the system. The ownership of file descriptors in use in the system is defined according to which network interface the file descriptor is associated with. In this case, the ownership can have three values in: L5; K; or unknown/indeterminate. These values could be indicated explicitly or by way of binary flags. The descriptor table maintained by the socket library indicates whether each descriptor is owned by L5, owned by K, or of ownership currently unknown to the socket library. Thus, in this case, the ownership can have three values: L5; K; or unknown/indeterminate. These values could be indicated explicitly or by way of binary flags. Exemplary entries in the table 40 are shown in FIG. 4. The descriptor numbers are listed in the left column and an indication of the ownership of each descriptor (as determined by the socket library) is shown in the right column. Thus, the table shows that descriptor number 0 has been determined to be owned by L5, the ownership of descriptor numbers 3 and 6 is currently unknown to the socket library, and descriptor number 4 is owned by the kernel. The table 40 is preferably stored securely such that users cannot access it directly and corrupt it by changing pointers in the table, for example by using read only memory mapping. It may suitably be stored in user address space.

The ownership of file descriptors in use in the system is defined according to which network interface the file descriptor is associated with. In this case, the ownership can have three values in: L5; K; or unknown/indeterminate. These values could be indicated explicitly or by way of binary flags.

Figure 2:
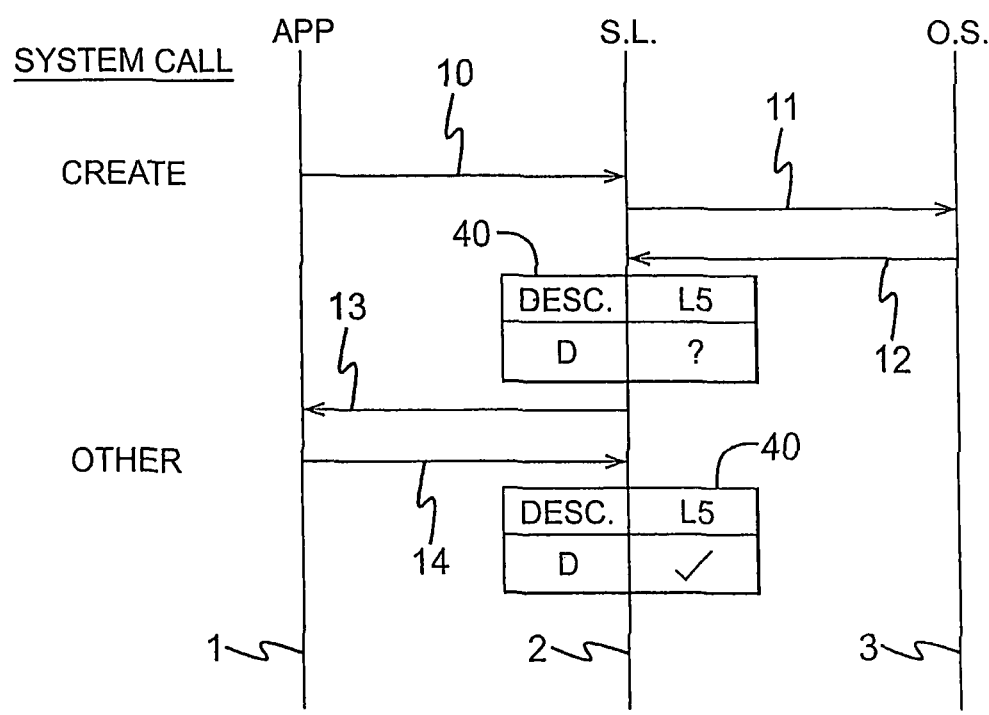
FIG. 2 represents a series of operations in a computer system.

In FIG. 2, a series of operations is illustrated. An application 1 invokes a socket( ) syscall 10 through the socket API 2, requesting that a new file descriptor be created. This could alternatively be achieved for example by using an open( ) call. In the present example, the application could be a webserver which creates a new descriptor which accepts new connections and then forks( ) a new process for each concurrent user. In the example, the server is initialising, and so a socket( ) call is made by the application.

At step 11 the socket library, which may be a standalone library or alternatively its functionality could be incorporated in a single system library such as libc invokes a syscall trap which causes execution to switch to the operating system. The operating system determines the syscall source and executes internal socket creation code within its network subsystem. This code will request a new file descriptor. The operating system checks its descriptor table and selects a descriptor D suitable for this application and then assigns it to the new file associated with the new user. An identifier of the selected descriptor D is then sent in step 12 by the operating system 3 to the socket 2.

In prior art systems, the passing of the syscall from the application to the socket library, and the invoking of the resulting system call at the socket is generally unhindered. In contrast, in the present system, the call is intercepted before it reaches the socket library. The intercepted message 12 is checked by the L5 socket library, and an identifier of the descriptor D is entered in the table 40, with an indication of indeterminate (unknown) ownership. An extract of the table 40 is shown below step 12 in FIG. 2.

An identifier of the descriptor D in the message 12 is then transmitted to the requesting application 1 in step 13. The application may then include this descriptor in further syscalls which it transmits, enabling the relevant resource to be identified.

In this embodiment, a network route table is maintained by the operating system 3 storing arguments and their associated routes including interfaces within the routes. The network route table typically stores network subnet address masks and their associated network interfaces. A given network address is matched against the table in such a way that the most specifically defined route can be chosen.

This table contains all external network routing rules for the computer system. The table is also associated with an API which enables entries in the table to be added or deleted. Because the route table is held in the OS a user-level stack would waste time making system calls to determine the route of packets being transmitted. To avoid this a local copy of the route table (and other control plane tables such as the list of network interfaces and the address resolution protocol (ARP) table) is maintained in the context of the user-level application. In the system of this example, the L5 stack is registered with the operating system to receive updates when the route table changes. The table is thereby copied into the L5 stack and if an application's route changes, the relevant information will be relayed to the L5 stack.

The L5 user-level stack provides a "look up route" function which, on receiving a request, can return details of whether or not a specified route goes through an interface associated with the L5 stack (in this example an L5 interface). This function will check a generation count to determine whether its cached route table state is still valid. If so it can use cached state, otherwise it needs to either make a system call or consult shared memory pages onto valid route table entries.

In step 14, another syscall is sent from the application 1. In this example it is a connect( ) syscall, specifying an address for connection which could be in another machine. The socket library 2 intercepts the message 14, determines the type of syscall and looks it up in a further table. If it is a type from which it will not be possible to determine the ownership of a descriptor, no further processing of the message is performed to establish the ownership. An entry already exists in the table 40 for the descriptor D, and the ownership indicated in the table will remain unchanged, as indeterminate. Information and the descriptor D in the message 14 will then be checked by the socket 2 to establish whether the message should be passed to the kernel or the L5 stack, and it will then be transmitted within the system to the appropriate interface.

On the other hand, if the syscall 14 is determined by the socket library to be of a type that could identify the ownership of the descriptor, the syscall will be further analysed. In the present example, the message is a connect request and so it will be further analysed. This analysis includes identifying the descriptor D and any arguments included in the message. The arguments can then be analysed by the socket library by means of a "look up route" request. The route table copied into the L5 stack will then be checked and an associated interface can thereby be identified. The ownership of the descriptor D is assumed to be the same as that of the interface, and the ownership data in the table 40 against descriptor D can then be updated. The socket library can thus identify whether the descriptor should be passed to the operating system 3 (or, more specifically, the kernel 4) or to the proprietary user-level stack 5. In the present example, the syscall 14 is determined to be directed to a L5 interface, and the descriptor D is therefore taken to be a L5 descriptor. The table 40 is updated with a positive indication of L5 ownership, as shown below step 14 in FIG. 2, and the syscall will be passed to the L5 stack which will perform the required operation within the application context.

When a subsequent message identifying descriptor D passes through the socket 2, the socket library can simply determine the descriptor from the message and look up that descriptor in the locally stored table 40 to determine its presumed ownership. Messages incorporating a descriptor owned by L5 will be intended to be passed directly down from the socket 2 to the L5 user-level stack 5 shown in FIG. 3. Because the ownership of the descriptor D is determined from the table 40 as being L5, messages intercepted by the socket library incorporating an identifier of the descriptor D will be passed directly down to the L5 stack 5 without first being sent to the operating system 3. Therefore, by means of embodiments of the present invention, only a simple analysis of a message passing through the socket library is required in order to be able to establish the appropriate part of the stack to which to pass the message. The high overhead in processing instructions to determine a path is thereby avoided. Preferably, if the ownership of a descriptor is recorded by the socket library as indeterminate, any message incorporating that descriptor will be sent to the operating system by default.

When a file is to be closed, a destructor syscall (usually close( )) is sent from the application 1 and intercepted by the socket library 2. The socket library can then identify that the descriptor is to be destroyed and remove the entry for that descriptor from the table 40. Then, when the descriptor is subsequently re-used by the operating system and assigned to a new process, the socket library can intercept the message from the operating system identifying the newly-assigned descriptor, as described above in relation to step 12 of FIG. 2. Alternatively, the entry could remain in the table and the associated indication of its ownership could be modified to show that its ownership is unknown to the socket library. Alternatively, the default setting for a descriptor's ownership could be "operating system".

The information stored in the table 40 may become obsolete when routing instructions within the computer system change. This could happen as a result of policy changes, for example when an application no longer runs with Level 5, or, more commonly, as a result of load balancing decisions within the computer system or other route updates caused by network topology changes. The information in the table 40 should be checked when such a change occurs. A convenient way of arranging the checking procedure is to reset a descriptor's ownership to indeterminate (or K) when such a change occurs so that until the correct new ownership information can be obtained a full processing operation will be carried out for the routing of messages to the operating system or the L5 stack via the socket 2. More generally a single generation counter is associated with each user-level socket state. Incrementing this counter will cause the L5 user-level stack to leave its fast path processing and determine the state change In a typical system as shown in FIG. 3, each application 1 has its own user-level TCP stack 5 by which it can communicate with its hardware 6. This enables shorter processing times because the application need not share the stack with other applications. As stated above, the stack 5 is in the same address space as its corresponding application. Additionally, each stack 5 is associated with a dedicated driver (not shown) in the kernel 4 of the operating system. In this arrangement, when the application 1 attempts to open a descriptor that is being used by the stack 5, for example a descriptor for accessing the TCP driver in the kernel 4, the operating system 3 cannot identify that there is a conflict because the stack 5 and the application 1 are in the same address space. The conflict arises due to the fact that in order for the L5 stack to operate it requires operating system descriptors, and these descriptors must be allocated from the same address space as the descriptors used by the application. However, the application has no a priori knowledge of the existence of the L5 stack.

A detailed example of file descriptor ownership will now be given in the context of the invention.

A file descriptor identifying a port of a network interface is allocated to a process of an application. The application is communicating with a data processing device remote from the system on which the application is running. The process therefore requires access to the relevant network interface port to enable communication of data between the host system and the remote device. The ownership of the file descriptor by the process permits such access. In this example, when the process wishes to transmit data to the remote device, it issues an appropriate syscall towards the OS. The interfacing library determines from its descriptor table 40 (illustrated here by a designation of "L5") that the transmit operation identified in the syscall is to be processed by the user-level stack 5. Thus, in the terminology of the present application, it may be said that the stack 5 owns the file descriptor identifying the network interface port, or that the file descriptor is allocated to the stack 5. In other words, the stack is to perform the processing (in this case, network protocol processing) of an instruction sent by the process and indicating the file descriptor. It may also be said that the file descriptor is owned by, or allocated to, the process sending the transmit instruction.

A specific example of the interception of a Dup2( ) call will now be described. The operating system 3 allocates descriptor number 42 for use by the L5 TCP stack 5. The application 1 then sends a Dup2(X,42) call, requesting that descriptor 42 becomes a copy of descriptor X. If this instruction were executed by the operating system it would cause a conflict because descriptor 42 is already in use to identify the stack. Normally such a conflict would be avoided by the operating system preventing one process from having access to a descriptor that is already in use by another process. However, in this case the application and the user-level stack 5 occupy the same application space as far as the operating system is concerned, and so the operating system could not normally allow this Dup2( ) call to proceed, unless the application were to first close the existing resource having descriptor 42. To avoid such a conflict, the socket library 2 intercepts Dup2( ) calls and identifies whether they request a descriptor assigned to the stack to be redefined. The socket library checks in the table 40, which additionally includes a flag indicating whether each descriptor is a private L5 user-level stack descriptor, and if it determines that there will be a clash, a series of operations is carried out by the socket library.

Thus, the socket library intercepts the syscall Dup2(X,42) from the application 1, which is an attempt to transform descriptor 42 into descriptor X. The socket library checks the table 40 for a flag indicating that 42 is private to the L5 stack. It determines that it is, and blocks the application's thread, as would happen for any syscall. The library obtains a lock on descriptor 42 to prevent other actions being carried out in relation to it. The library then sends a Dup2(42,Y) call to the operating system, requesting that the current definition of descriptor 42 is duplicated at some unused descriptor Y, so that the stack can subsequently operate with descriptor Y.

If the Dup2(42,Y) call fails, for example due to an internal error within the stack 5, the socket library forges a message to the application 1 to indicate that the Dup2(X,42) call from the application failed. On the other hand, if the Dup2(42,Y) call succeeds, the application's thread is released, and the Dup2 (X,42) call can be forwarded by the socket library to the operating system. When the socket library receives a response from the operating system indicating that the Dup2(42,Y) call was successful, it forwards a response to the application, which the application interprets as being confirmation that its Dup2(X,42) call succeeded. The application can then use descriptor 42 and the stack can use the new descriptor Y, and the potential conflict is thus prevented.

The sequence of operations described above can involve a high processing overhead, so to inhibit an application from requesting the use of a descriptor that is in use by the stack, it is preferred that such a descriptor is marked by the operating system as reserved. The operating system would then be unlikely to inform an application that such a descriptor is available and so it is unlikely that the application will request the use of such a descriptor.

When a fork( ), exec( ) sequence is performed on an application, the child application can choose to retain the file descriptors of the parent application in such a way that all details of the parent application except the file descriptors are destroyed. By virtue of multiple fork/exec operations with respect to a single user-level transport library, multiple applications can eventually be mapped onto the same state in an operating system. This can lead to considerable contention for the lock required to enable access to the shared state, which can be inefficient as applications are generally required to spin or block while they await access to the state.

When a new application is created, it acquires a process ID (PID) which is unique within a host. According to one embodiment as shown in FIG. 5, an exec table 51 is maintained by the operating system 5 in which each record has: a PID; pointers to a system-wide file descriptor table 52 which contains characteristics of all descriptors in use in the system, including pointers to state 53 in the operating system; and file descriptors that are used by that PID, for example having been preserved following an exec( ) call.

In the case when the data locations allocated to a process are managed by the operating system, the operating system can establish equivalent data locations and if necessary populate them with equivalent data when an exec( ) call is issued. However, in the case when the data locations allocated a process are managed by an entity other than the operating system, for example by a socket library such as socket library 2, the operating system may not be able to establish equivalent locations and/or populate them because it may not have knowledge of which locations and data were allocated to the original process.

To address this problem, the socket library of the present system is arranged to intercept exec( ) calls from the application level to the operating system. In this sense it effectively interfaces between the application level and the operating system, although there is no necessity for all communications from one level to the other to pass through the library: the library could simply configure the system to have exec( ) calls directed to it rather than to the operating system. On being alerted to an exec( ) call the library executes a module that manages the establishment and if necessary population of the appropriate memory locations that are associated with the parent application. As regards memory locations that are managed by the library, the module establishes and populates those itself. As regards memory locations that are managed by the operating system, the module signals the operating system to cause it to establish and populate them.

Examples of memory locations that could be managed by the library include ones that relate to the state of transmission or reception facilities that are managed through the library. In the case of a networking system these could include transmission or reception state information, including queue states, protocol stack states, connection states, lists of acknowledged or unacknowledged buffers, lists of data that is to be retransmitted, timeout values and information defining virtual interfaces. In other systems the memory locations could include other types of state information such as display window contents, the contents of files that are to be processed or system settings.

In one embodiment, the socket library 2 intercepts an exec( ) call and can read it to reconstruct state data, which in the present example is for a new L5 process. When the library has intercepted the exec( ) call, an entry is made in the exec table 51 and the exec( ) call is processed. The new process then starts, and a new L5 library is set up. The initialisation of the new library (which may be triggered by means of an init( ) syscall) involves checking via an access of the L5 file descriptor to the exec table 51 of the operating system 5, and the exec table 51 is recreated as a new table (not shown in FIG. 5) in the library. This table can record details of whether a file descriptor has been involved in an exec( ) operation. This table could be the same as the table 40, but preferably it is separate. Preferably the new exec table and the descriptor table 40 are both stored locally by the library. For efficiency reasons, instead of copying the entire contents of the exec table 51 into the library, a copy can be constructed in a "lazy" manner as the new application attempts to access each file descriptor. In other words, the first time each file descriptor is used in a call from the new process, the library obtains from the OS exec table 51 the details (e.g. the associated PID and pointers to the system-wide descriptor table 52) for that file descriptor and stores a record for that file descriptor in the copied version of the table. Since file descriptors may be closed or reallocated before they are required for use by the new process, copying records of the exec table in a piecemeal manner as each file descriptor is actually used by the new process can avoid the overhead that would otherwise be associated with copying contents of the table that are not required by the new process.

The system-wide table 52 maintained by the operating system 5 can keep track of file descriptors which have been preserved following a fork-exec operation. This system-wide table records which file descriptors are in use for which applications. Each file descriptor is assigned a reference number by the operating system 5 which is unique across the system. This can be necessary because two applications which do not communicate with each other can use identical file descriptor numbers without any conflicts occurring. However, it is convenient to be able to identify a particular file descriptor in use by a particular application with a unique number.

The system-wide table 52 also stores pointers for each file descriptor to state 53 within the system. The state associated with a file descriptor of a child process will typically be the same as the state associated with its parent process and the process of reconstruction requires that the newly exec-ed application makes system calls to the L5 driver in order to reattach to the shared state.

As stated above, it can occur that due to multiple fork-exec operations many processes come to be sharing the same state. This is inefficient since a process would have to await access to a lock on the state and this generally involves blocking. To reduce such contention, the operating system 5 preferentially assigns new memory space (e.g. a new network interface) to each forked application as it requests its first new file descriptor.

The dup2( ), fork( ) and exec( ) instructions discussed above are examples of instructions used in the Unix and Linux operating systems to perform duplication of descriptors, duplication of processes and re-initialisation of processes respectively. Other operating systems may be responsive to other instructions to perform functionally equivalent operations, and similar techniques can be applied to avoid conflicts or contention in those operating systems too.

The present invention has been described with reference to an implementation for transmitting and receiving data over a network. However, it is applicable in other situations such as, more generally, where a resource that is identified by a descriptor and is configured without the direct knowledge of an application shares an address space (or other means by which it can be identified by the operating system for the purpose of preventing clashes on execution of duplication instructions) with that application. Examples of such situations could involve the provision of a user-level resource for interfacing with a storage device or for buffering data to an on-board co-processor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Routing Tables

This invention relates to routing data within a computer system, and in particular but not exclusively to routing data within a network. In order to transmit data between data processors in a network such as an Ethernet network, data is formed into packets. Each packet includes a header specifying the destination of the data in the packet. In an Ethernet network the destination is typically specified by means of an Ethernet address 11, an Internet Protocol (IP) address 12 and a Transmission Control Protocol (TCP) address 13 as illustrated in FIG. 8.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Figures 7, 8:
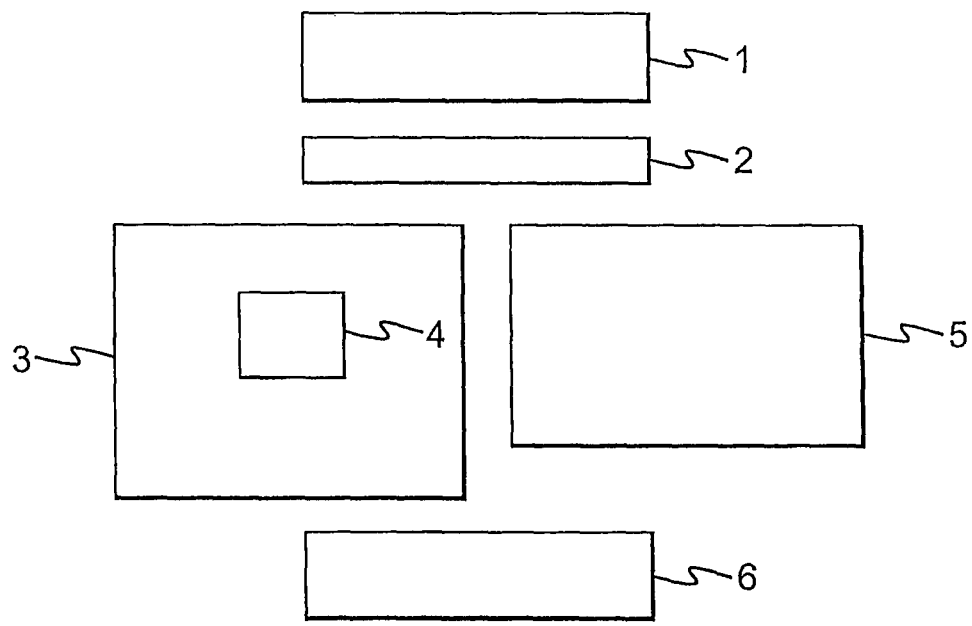
FIG. 7 shows a prior art computer system.
FIG. 8 represents a typical prior art data packet.

FIG. 7 shows components implementing a TCP stack. Layers of the stack include an application 1 and a socket 2 provided by a socket library. The socket library is an application program interface (API) for building software applications. The socket library can carry out various functions, including creating descriptors and storing information. Additionally, there is an operating system (OS) 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 7. The hardware could be a network interface card (NIC).

In order to perform routing the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. However, in order to preserve the integrity of the tables that it stores, the OS is likely to perform security checks on any accesses to the tables. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network.

According to a first aspect of the present invention there is provided a data processing system comprising: an operating system that stores a first network routing table comprising one or more entries each indicating at least part of a route over a network to a respective destination; a transmission support function arranged to maintain a copy of the first network routing table; and a network data transmission function arranged to transmit data in accordance with the copy network routing table and without accessing the first network routing table.

The transmission support function could conveniently be internal to the operating system. The network data transmission function could be external to the operating system. The network data transmission function is preferably at user level.

The first network routing table could comprise data enabling routing using address resolution protocol. The first network routing table could comprise data enabling routing using transmission control protocol and/or user datagram protocol.

The operating system could be arranged to signal to the transmission support function when data stored in the first network routing table is updated. The transmission support function is preferably arranged to check the first network routing table for updates. The network data transmission function is preferably arranged to read the copy network routing table by means of memory mapping, and the memory mapping is preferably read only memory mapping.

The data processing system may further comprise a network endpoint and the system could be arranged such that the network endpoint is unable to access the first network routing table directly. The data processing system preferably has a counter and is preferably arranged to maintain the counter by incrementing it each time a change is made to the first network routing table. The operating system may be arranged to transmit data using the first network routing table.

The network data transmission function is preferably arranged to transmit the data in accordance with the copy network routing table in the form of packets and to create packet headers for such packets based on information in the copy network routing table.

The operating system may be arranged to delete entries from the first network routing table if they are unused. The operating system may be arranged to periodically delete, with a first frequency, unused entries from the first network routing table.

The network data transmission function may be arranged to transmit to the operating system signals for causing the operating system to maintain entries in the network routing table. The signals are preferably dedicated messages for maintaining tables in the operating system. The signals could be address resolution protocol reinforce messages. The signals may be sent periodically with a second frequency, and the second frequency is preferably greater than the first frequency.

According to a second aspect of the present invention there is provided software for execution by a data processing system comprising: an operating system that stores a first network routing table comprising one or more entries each indicating at least part of a route over a network to a respective destination; the software defining: a transmission support function arranged to maintain a copy of the first network routing table; and a network data transmission function arranged to transmit data in accordance with the copy network routing table and without accessing the first network routing table. According to a third aspect of the present invention there is provided a data carrier carrying software as defined above.

In the system to be described below a driver accesses routing tables stored by the kernel of the operating system. The driver preferably resides in the operating system so as to readily access the operating system's routing tables. The driver maintains a copy of the operating system's routing tables: conveniently in memory to which the driver has write access and to which a user-level networking function of the system has read access without performing calls on the operating system. The user-level networking function then performs network data transmission operations using the copy routing tables rather than those maintained directly by the kernel. This avoids the need for it to involve the kernel when accessing those tables, which it may preferably do by virtue of a memory mapping.

Figure 9:
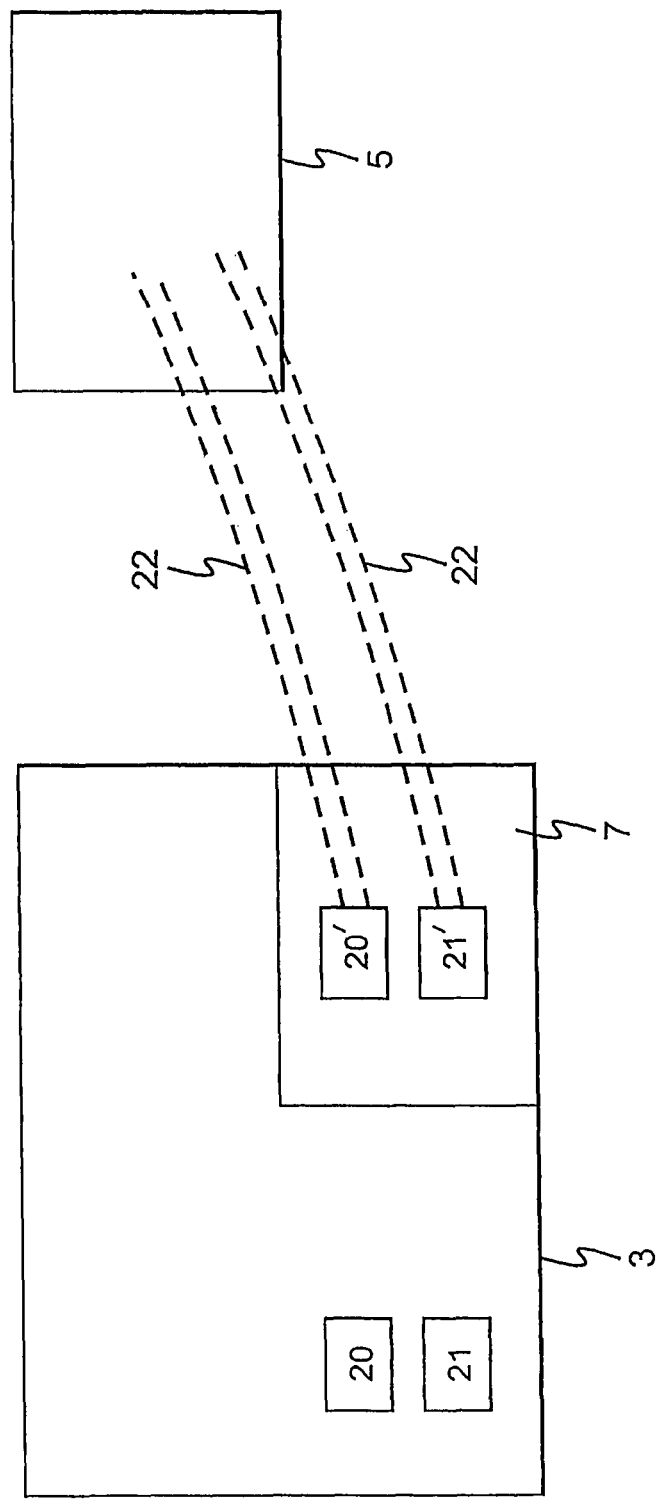
FIG. 9 shows components of a computer system in accordance with embodiments of the present invention.

FIG. 9 shows an OS 3 in a computer system having a TCP user-level stack 5. The OS is provided with a TCP driver or helper 7 supporting the stack 5. Routing tables 20, 21 are maintained in the OS which specify the rules for routing data within a network including the computer system of FIG. 9. The tables could be a TCP routing table 20 (which could also be used for UDP) and an address resolution protocol (ARP) table 21. They specify details such as the interfaces and gateways through which data should be transmitted in order for it to reach a particular destination within the network. The present system may be applied to all routing tables in a system, or only to one or more selected tables. The tables may be for Ethernet protocols such as TCP or for other network protocols.

When an application within the computer system of FIG. 9 wishes to transmit a packet of data it needs to access the tables 20, 21 in order to create an appropriate header to ensure that the packet is routed correctly through the network. When TCP packets are to be sent, copies of the tables 20', 21' which are maintained in the TCP driver 7 are accessed by the socket library 2 to avoid the necessity to access the tables directly in the OS. Memory mapping 22 between the driver 7 and the user-level TCP stack 5 enables the stack 5 to access the copy tables 20', 21'. Thus, the socket library can simply access the stack 5 in order to obtain the required information from the tables 20, 21. Instead of a memory mapping, all the data defining the tables or updates to them could be transmitted from the driver 7 to the stack 5. However, this would be less efficient.

In order to avoid locking requirements between TCP endpoints which would otherwise be required, each endpoint maintains a generation counter which is incremented as a result of a routing table callback, or any other state change such as an ARP timeout (discussed below) which would render state cached at the endpoints inconsistent. If a TCP endpoint detects that its generation counter has been incremented then it will leave its fast path, which involves accessing cached interface and packet header information, and will instead consult the user-level stack's tables.

It is preferable for the mapping 22 between the driver 7 and the user-level stack 5 to be read only. The prevents the stack 5 from corrupting data in the OS by writing directly to it. Corruption of the original tables would be adversely affect other applications running on the OS. In a preferred embodiment the user-level stack 5 is a Level 5 (or L5) stack. The driver 7 is a corresponding L5 driver.

In order to keep the copy tables up-to-date the driver 7 registers with the OS to obtain updates of the routing tables via call backs. By this means new data in the tables 20, 21 can either be passed directly from the OS to the driver 7, or alternatively the driver 7 could simply be informed when a change is made to the tables and subsequently access the tables to obtain the new information. Either of these arrangements allows the driver to maintain up-to-date tables without altering the data in the original tables 20, 21.

When a TCP packet is to be sent, the data to be transmitted is written to shared memory, and an indication of the destination is passed to the user-level stack. The user-level stack checks in locally stored data to establish whether it already has access to the Ethernet address of the destination. If so, it forms and sends the Ethernet packet directly. If not, it sends a call to the driver which checks its tables 20', 21' to establish the relevant address. If the Ethernet address is not known to the driver, the driver can issue an ARP request for the address over the network. Once a response is received via the OS, the packet can be formed and sent by the user-level stack.

Since ARP is a dynamic protocol, entries in the ARP table 21 are held for a predetermined time, say 30 seconds, and then removed if they have not been used. By "used" may be meant accessed for any purpose, although some systems may remove entries if they have been accessed only for a defined subset of purposes in the predetermined time. Although entries in the tables 20, 21 may not have been accessed directly, they may have been used indirectly in the copy tables 20', 21'. Thus, it could appear to the OS that the entries are redundant even if they are in fact still in use. It is therefore desirable to cause the OS to continue to hold entries which are only being used indirectly through the copy tables rather than permitting them to be deleted after a time-out. In order to achieve this, an embodiment of the invention requires the L5 driver to run a timer which counts the time since an entry was made in the ARP table 21 and when the predetermined time period is reached, the entry is "reinforced" in the table 21 by means of a duplicate entry being sent to the OS by the driver 7. The predetermined time period counted by the timer is preferably slightly less than the time-out of the ARP table. For example, if the ARP time-out is 30 seconds, the predetermined time period of the timer could be 28 seconds. In this way, a duplicate entry is made in the table just before the previous entry is removed so that there is no time at which an entry for the particular address is not present in the main ARP table 21.

In the preferred embodiment this "reinforce" procedure is carried out for selected ARP entries as follows. The driver checks a table shared with the user-level stack 5 listing active endpoints in the network. If an ARP table entry is for one of these active endpoints then the entry will be reinforced by the driver. Otherwise, it can be allowed to be removed by the OS.

The procedures described above can all operate without the addressor system (i.e. the user-level stack) being aware that there is any difference compared with a standard system configuration in which the OS is accessed directly for address data. The driver could be located outside the operating system if the operating system supported providing it with suitable access to the routing tables.

The computer system could be a multi-purpose device such as a personal computer or a server. Alternatively it could be a dedicated device such as a network-attached storage (NAS) or web server device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Memory Access

Figure 10:
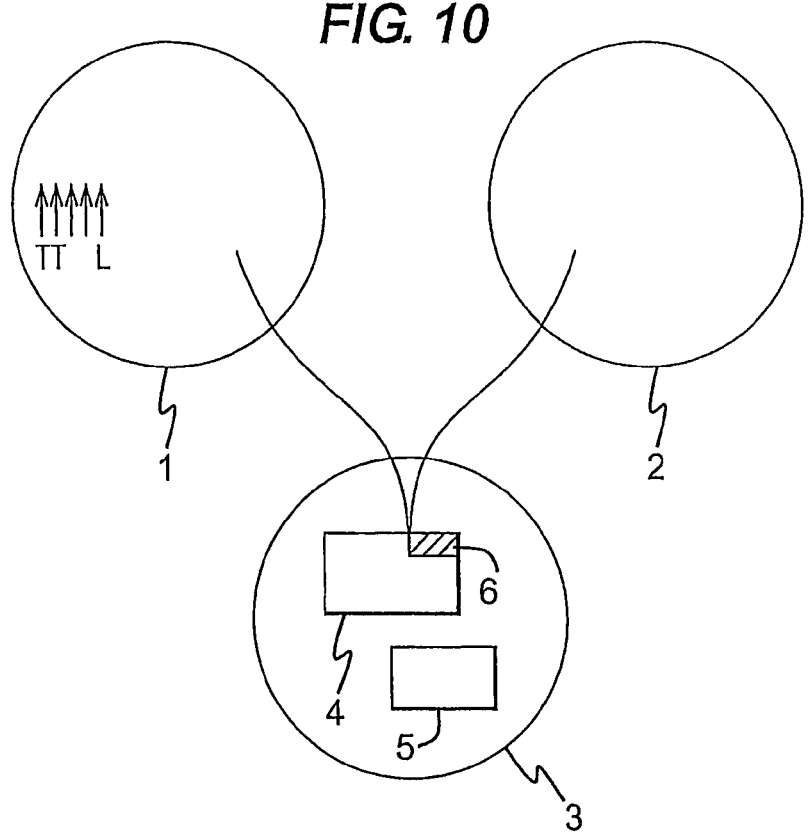
FIG. 10 represents a system including an operating system and applications in communication with the operating system.
Figure 11:
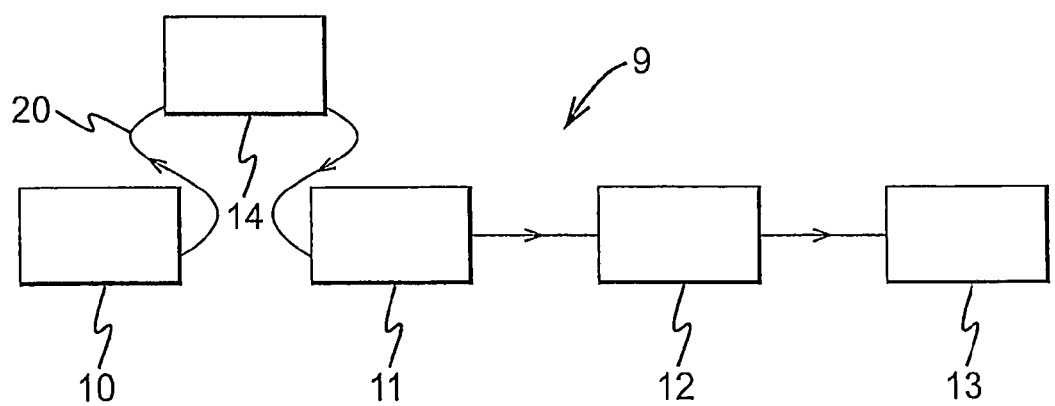
FIG. 11 represents a queue including details of applications waiting to access shared memory.

This invention relates to the use of shared memory in computer systems, and in particular to controlling access to shared memory in such systems. In computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below. FIG. 10 is a schematic figure showing two different applications 1, 2 which can communicate with state, or memory, 4 controlled by an operating system 3.

Multiple threads can exist within a single application process and can execute concurrently with access to all the memory of the application context. Thus, there may be multiple threads within each application 1, 2 wishing to access the shared memory 4. If more than one process or thread were permitted concurrent access to the memory 4 then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory 4, the lock 6 associated with the memory will enter a locked state, indicating that the memory 4 cannot currently be accessed by other threads. When another thread (T) makes an attempt to access the memory 4 while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space 4 while it is being used can cause an entry to be added to a queue so as to indicate that the threads are awaiting access to the memory. Typically, a thread or application will register its interest in the memory 4 and will subsequently attempt to access it via the lock state 6. The step of registering an interest will cause an entry relating to that thread or application to be made in a queue. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications. This technique can take many forms but one implementation is known as a "condition variable".

It is also known for an application, on releasing a lock, to send a system call (syscall) to a driver within the operating system to initiate the sending of a wake-up call to waiting applications. The driver could, for example, be a user-level transmission control protocol (ULTCP) driver 5. The driver 5, on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

According to a first aspect of the present invention there is provided a data processing system arranged to control access by a plurality of processes to a region of shared memory, the data processing system being arranged to: prevent more than one process from concurrently accessing the region of shared memory; establish a data structure for holding items of a first type each comprising an indication of another of the plurality of processes, which is attempting to access the region of shared memory, and a definition of an operation on the region of shared memory; and on a process finishing accessing the region of shared memory, action an item in the data structure by performing the defined operation by other than the process indicated in that item.

According to a second aspect of the present invention there is provided a data processing system arranged to control access by a plurality of processes to a region of shared memory, the data processing system being arranged to: prevent more than one process from concurrently accessing the region of shared memory; establish a data structure for holding items of a first type each comprising an indication of another of the plurality of processes, which is attempting to access the region of shared memory, and a definition of an operation on the region of shared memory; and on a process becoming permitted to access the region of shared memory, action an item in the data structure by performing the defined operation by other than the process indicated in that item. Preferably the data structure is a lockless data structure. Preferably the operation is one of: an operation for storing data in the region of shared memory; and an operation for transmitting data from the region of shared memory.

Preferably the data structure is further arranged to hold items of a second type each comprising an indication of another of the plurality of processes, which is attempting to access the region of shared memory, and an operation of waking the indicated process; the data processing system being further arranged to, on a process finishing accessing the region of shared memory, action an item in the data structure by waking the indicated process.

Preferably the items of the second type held in the data structure are accessible only by an operating system arranged to control the data processing system. Preferably the data structure is stored in the region of shared memory. Preferably the data structure is accessible by the operating system and at least some of the plurality of processes. Preferably the content of the data structure can be modified by the operating system and at least some of the plurality of processes. Preferably the data structure can be read by the operating system and at least some of the plurality of processes.

Preferably the data processing system is arranged to: on a process finishing accessing the region of shared memory, action the next item in order in the data structure by: if the item is of the first type, performing the defined operations on the region of shared memory by an operating system of the data processing system.

Preferably the data processing system is arranged to: on a process finishing accessing the region of shared memory, action the next item in order in the data structure by: if the item is of the first type, performing the defined operations on the region of shared memory by another of the plurality of processes. Preferably the operating system is provided with application specific code for enabling the operating system to perform at least some of the defined operations.

According to a third aspect of the present invention there is provided a method for controlling access by a plurality of processes to a region of shared memory data in a data processing system, the method comprising: preventing more than one process from concurrently accessing the region of shared memory; establishing a data structure for holding items of a first type each comprising an indication of another of the plurality of processes, which is attempting to access the region of shared memory, and a definition of an operation on the region of shared memory; and on a process finishing accessing the region of shared memory, actioning an item in the data structure by performing the defined operation by other than the process indicated in that item.

According to a fourth aspect of the present invention there is provided a method for controlling access by a plurality of processes to a region of shared memory in a data processing system, the method comprising: preventing more than one process from concurrently accessing the region of shared memory; establishing a data structure for holding items of a first type each comprising an indication of another of the plurality of processes, which is attempting to access the region of shared memory, and a definition of an operation on the region of shared memory; and on a process becoming permitted to access the region of shared memory, actioning an item in the data structure by performing the defined operation by other than the process indicated in that item.

Embodiments of the invention can allow applications to queue in an orderly way for access to the shared memory, and can allow applications to write state to the queue to specify desired future actions. For example, embodiments of the invention can enable an application, when releasing a lock on the memory, to access the queue to identify which applications are waiting for access to the memory, and to select a waiting application to which the lock is to be transferred. For example, a thread L within an application could check the queue when it has completed its use of the shared memory, and select a thread T within the same application and ensure that the lock is passed directly to that thread T in preference to other waiting applications, without the lock being released and without a wake-up call being issued to other waiting applications.

Atomic instructions are an efficient way of creating and modifying a queue in the present situation since they do not themselves require the overhead of lock acquisition. They can be executed fast, in a single processor cycle, and they enable small modifications to be made to a data structure without delay. In a particularly preferred embodiment of the invention, the queue is a compare-and-swap list (CASL). Such a list does not need to be locked while it is being modified. When an application attempts to access the memory while it is locked, the application can register its interest in acquiring the lock and subsequently be added to the bottom of the queue.

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral device must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

Figure 12:
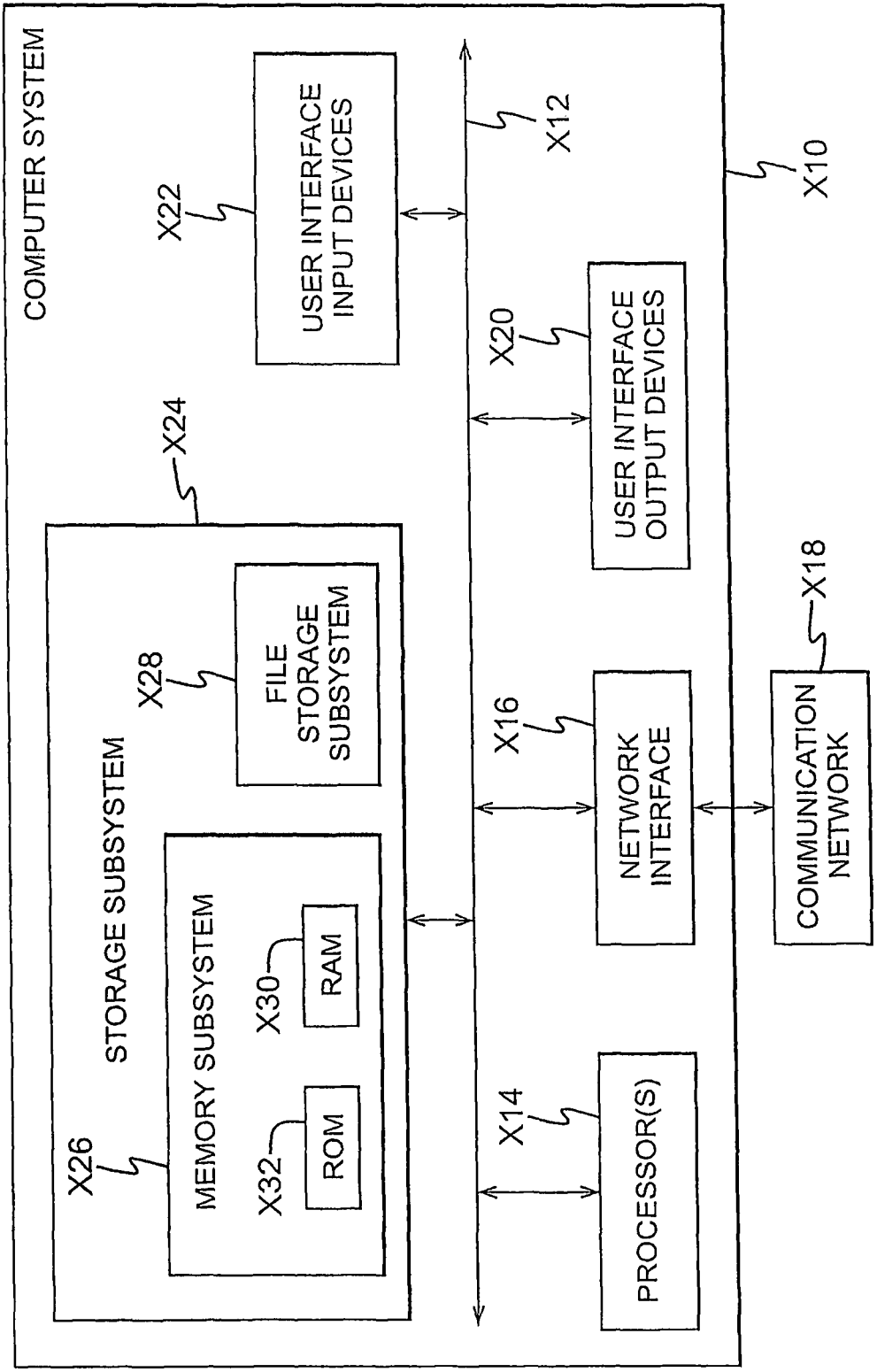
FIG. 12 shows a hardware arrangement suitable for use with embodiments of the invention.

FIG. 12 is a simplified block diagram of a computer system X10 suitable for use with embodiments of the present invention. Computer system X10 typically includes at least one processor X14 which communicates with a number of peripheral devices via bus subsystem X12. These peripheral devices may include a storage subsystem X24, comprising a memory subsystem X26 and a file storage subsystem X28, user interface input devices X22, user interface output devices X20, and a network interface subsystem X16. The input and output devices allow user interaction with computer system X10. Network interface subsystem X16 provides an interface to outside networks, including an interface to communication network X18, and is coupled via communication network X18 to corresponding interface devices in other computer systems. Communication network X18 may comprise many interconnected computer systems and communication links. These communication links may be wireline links, optical links, wireless links, or any other mechanisms for communication of information. While in one embodiment, communication network X18 is the Ethernet, in other embodiments, communication network X18 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices X22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system X10 or onto computer network X18.

User interface output devices X20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system X10 to the user or to another machine or computer system.

Storage subsystem X24 stores the basic programming and data constructs that provide the functionality of certain embodiments of the present invention. For example, the various modules implementing the functionality of certain embodiments of the invention may be stored in storage subsystem X24. These software modules are generally executed by processor X14.

Memory subsystem X26 typically includes a number of memories including a main random access memory (RAM) X30 for storage of instructions and data during program execution and a read only memory (ROM) X32 in which fixed instructions are stored. File storage subsystem X28 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem X28. A host memory contains, among other things, computer instructions which, when executed by a processor subsystem, cause the computer system to operate or perform functions as described herein.

Bus subsystem X12 provides a mechanism for letting the various components and subsystems of computer system X10 communicate with each other as intended. Although bus subsystem X12 is shown schematically as a single bus, alternative embodiments of the bus subsystem may use multiple busses.

Computer system X10 itself can be of varying types including a personal computer, a portable computer, a workstation, a computer terminal, a network computer, a television, a mainframe, or any other data processing system or user device. Due to the ever-changing nature of computers and networks, the description of computer system X10 depicted in FIG. 12 is intended only as a specific example for purposes of illustrating the preferred embodiments of the present invention. Many other configurations of computer system X10 are possible having more or less components than the computer system depicted in FIG. 12.

With reference to the threads and the memory illustrated in FIG. 10, an exemplary series of events in accordance with embodiments of the invention will now be considered. A thread L within the application 1 currently has the lock 6 on shared memory 4 controlled by the operating system 3. A single field in the shared memory comprises: i) the lock; ii) a set of flags; and iii) data. One of the flags indicates whether or not the lock is currently locked. Other flags are used to indicate the presence of outstanding actions, and the data may be used to give details of the actions. Each thread has an associated set of flags, with one flag for each available type of action. This field can be updated atomically by the use of compare-and-swap instructions.

Additionally, the operating system holds a data structure 9 of processes 10-13 that are waiting for the lock. This can suitably be protected by a conventional spin-lock. When the lock is uncontended it is possible to lock and unlock it using a single compare-and-swap instruction. Data relating to the requested actions can be stored in the shared memory of the operating system. System stability concerns mean that the operating system will usually copy out such state into private storage to ensure consistency. This would mean that the callback or action request would have to be registered as part of the system call which requested the wait. If the lock is shared between multiple threads from the same application then it is safer to allow shared state to be accessible between all threads and enable lighter-weight operations to be used to register an interest or callbacks on a lock.

Threads T within the application 1, and a process (which may be a thread or an application) 2, each wish to gain access to the memory 4. Each of these processes independently makes an attempt to access the memory by trying the lock (for example using an atomic instruction). Because L already has access to the shared memory the attempt by T will be unsuccessful. T then registers an interest in the lock. The registering of an interest involves adding an item 10 to the data structure 9 such that the process is identified in the data structure as requiring the lock. Instead of adding an item to the data structure, a previous item associated with the thread or application could be re-used. The data structure is preferably maintained as a bit map which can be atomically updated using compare-and-swap instructions. Alternatively, the data structure could be a CASL (compare-and-swap list). The use of atomic instructions means that the data structure does not need to be locked when it is being written to. It is preferred that the data structure is a lock-free data structure: i.e. that it can be accessed by processes without first being locked in such a way as to prevent access to it by other processes. This is most preferably achieved by it being accessible (optionally exclusively accessible) by means of atomic instructions.

The data structure can include details of the thread attempting to access the memory and an action relating to the thread. The action could be a wake-up call, so that when the memory becomes available a wake-up call is sent to alert the thread. Alternatively the action could be an operation which the thread intended to perform when it acquired the lock, such as transmitting a packet of data. If the data structure is a bit map, it could conveniently be in the form of a table having columns indicating each thread using the operating system and rows indicating the various actions. Thus, if thread T was intending to transmit a packet of data on acquiring the lock, it could create an entry in the bit map indicating a "transmit packet" action against thread T. There could conveniently be a bit allocated for indicating whether or not any threads are blocking while waiting to acquire the lock. This bit can indicate to a releasing thread that it may be required to perform some further action on unlocking.

If the data structure is a CASL, the application could add pointers 20 into the list for specifying a particular type of action or callback 14. For example, a thread T might wish to specify that when the lock is released the memory 4 is to be connected to that thread T and a wake-up is then to be transmitted to the thread. In the meantime, the thread can block, or "go to sleep". Alternatively, the thread T might wish to specify that a particular action is to be performed immediately before the lock is released by the thread L. This could be efficient if the thread T wishes to perform the action but the performance of the action requires the lock to be held. T may not wish to block until the lock is released by L (because that would degrade performance), or it might not be able to block, for example because it is an interrupt service routine. By the use of a callback as described, T can ensure that the action is carried out as soon as possible and without T having to block in the meantime to await the lock.

When the thread L finishes its use of the memory space 4, the list 9 is checked and a decision is made, on the basis of the items in the data structure, how to proceed. The data structure is generally only accessible by the operating system. However, in the case where the lock is shared between threads in the same address space the state comprising the data structure can be visible to all of the threads sharing the lock.

For example, if T has registered an action to transmit a data packet, then when L finishes its use of the memory the data packet will be sent as requested, on behalf of T, without T needing to acquire the lock itself. This can have considerable efficiency savings because once T has registered the action in the data structure it can continue with other operations without needing to make further attempts to acquire the lock in order to send the data packet. The transmission operation could be carried out by the operating system or by the thread L releasing the lock if the releasing thread has the appropriate operability. To enable the operating system to perform the same operations as would ordinarily be performed by threads of an application, code representing relevant application logic could be stored in the operating system. In a further example, the requesting thread T could ask to be woken up while L is still holding the lock, thus implicitly "passing" the lock from L to T.

The arrangement described above could advantageously be applied in an application in which a pair of threads are sharing access to memory space. In such an application, the overhead associated with locking and unlocking can be reduced by instructing one thread to perform the other's work while the first thread holds the lock. An item in the list 9 can include: an identifier of a thread or application; the priority of the application; and an action to be taken when the lock becomes available.

In this example, when the thread L has accessed the queue 9 it decides that another thread within the application 1 is to receive the lock next, and subsequent actions can be carried out either internally within the application or through the operating system 3. In the present example, the thread L decides on the basis of the list 9 that the lock is to be passed directly to one of the threads T within the application 1. The operating system therefore need not be involved in the subsequent actions and the thread L can communicate with the thread T to indicate that it can now obtain the lock.

The subsequent actions could involve waking or alerting processes. The subsequent actions could involve performing certain processing tasks, such as storing specified information in memory, preferably in the shared memory area itself.

If the thread L were instead to decide that the lock was to be passed to a different application, the lock would be passed to the operating system, or more specifically to the kernel within the operating system, which would scan the queue 9 and decide which application should have the lock next. A syscall could then be initiated by the kernel to wake up the appropriate application. It is not essential for an application to decide where the lock should be allocated next—it can simply wake the lock (which will pass the lock to the OS) and the callbacks occur as the lock is released.

In the present example, the lock is passed to one of the threads T. The item in the list 9 relating to the thread T is then deleted or marked as "done" by that thread.

It can be seen that, using embodiments of the present invention, high priority applications can be dealt with quickly in the queueing system, and the lock can efficiently be passed within an application, between applications, and between the OS and another application.

When the OS accesses the queue, it must verify that the instructions are valid and do so in such a manner that any corruption of the instructions during the verification process or in their subsequent execution cannot cause system instability. It therefore checks the validity of pointers and copies the memory.

Different types of callback can be specified. In particular, lock-callbacks and unlock-callbacks can be defined. A lock-callback specifies actions which are to be carried out once a particular process acquires the lock. If a process attempts to obtain a lock and at the same time requests a lock-callback then the attempt will fail. The code will instead execute a slow path involving:

Optionally sleeping until the lock becomes available
Invoking any requested lock-callbacks once the process has obtained the lock.

Unlock-callbacks cause actions to be carried out when a process finishes with the shared memory and attempts to release the lock. If an unlock-callback has been requested, then when a process finishes with the lock its attempt to unlock, with an atomic instruction, will fail. Instead, the code will execute a slow path involving invoking the requested callbacks and executing an atomic compare-and-swap to clear the callback requests and unlock the lock simultaneously.

If another callback is requested at the same time then the atomic compare-and-swap may fail. In that case, steps 1 and 2 would be performed again until the operation was successful.

It is preferred that callback requests are set using instructions that are atomic with respect to locking and unlocking. This avoids introducing race conditions.

An example will now be considered in which a first process A has the lock on a region of shared memory and a second process B wishes to access the memory. B will attempt to lock, and when it fails (and wishes to wait) it does the following:

Places itself on the queue of processes that are waiting;

Requests a wake-up unlock-callback (if one has not already been requested);

Goes to sleep, awaiting a wake-up call.

Then, when process A wishes to release the lock, it will attempt to unlock. The unlock attempt will fail because an unlock-callback is pending. The slow path will then be executed so that the callback is invoked. A syscall will be executed by process A to ensure that the operating system wakes the process C at the head of the queue of processes that are waiting. Once woken, the process C can then attempt to obtain the lock. If it fails (for example because another process obtained the lock first) then process C will perform steps 1-3 above until it succeeds (or until a timeout or some other error condition).

In addition to the above set of operations, embodiments of the present invention enable actions other than wake-ups to be requested dynamically and atomically. For example, these embodiments can be applied to situations in which a resource needs to be freed, or in which a process is blocked in a TCP/IP stack waiting for some condition. In this latter case, it is necessary that some thread of execution will wake the process when the condition is met. When the process that currently has the lock releases it, and unlock-callback is used to request a notification when the condition is met. the notification may come from some other software process, or from hardware.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Intercepting Instructions

This invention relates to directing instructions in computer systems. In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

Figure 13:
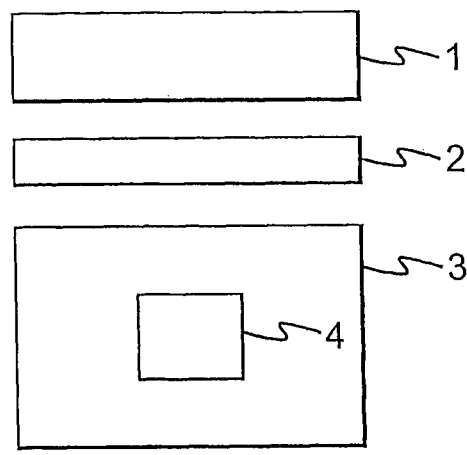
FIG. 13 shows a prior art computer system.

FIG. 13 represents equipment capable of implementing a prior art protocol stack, such as a transmission control protocol (TCP) stack in a computer connected to a network. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network.

Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

When a network related application program interface (API) call is made through a socket library this causes a system call to be made, which creates (or opens) a new file descriptor. For example the accepts( ) system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. An alternative architecture is a user-level architecture, as described in the applicant's co-pending applications WO 2004/079981 and WO 2005/104475. In a user-level architecture at least some of the functions usually performed by the operating system are performed by code running at user level. In a user-level architecture at least some of the state of the function can be stored by the user-level code. This can cause difficulties when an application performs an operation that requires the operating system to interact with or have knowledge of that state.

In embodiments of the present invention syscalls passing through the socket can be analysed to establish the file descriptor and any information identified in the syscall that indicates the path by which the syscall is to be directed, and decisions can thereby be made by the socket so that the syscall can be transmitted in a suitable way from the socket.

An example of a syscall is Dup2($a,b$), which has the effect of duplicating the file or other resource represented by descriptor "a" and creating a new resource represented by descriptor "b" and having the same properties. One example of when such a call might be useful is when a descriptor that has a system-wide significance (for example the descriptor that maps on to error output—commonly descriptor #2) is to be redirected on to some other file or device.

Other examples of syscalls are fork( ) and exec( ). A fork( ) call typically creates a new process (child) from the old one (parent) which initially shares all state including memory mappings and file-descriptors. After a successful fork( ), two copies of the original code will be running. An exec( ) call can then be requested for the child process. This will replace the current process image with a new process image, but details of the child process can be preserved. For example, specific file descriptors can be preserved in the child and (often) closed by the parent; thus handing over control of a file descriptor from a parent to a new child process.

According to a first aspect of the present invention there is provided a data processing system comprising: an operating system for supporting processes, the operating system being arranged to output data by addressing the data to a descriptor corresponding to the intended destination of the data; an interface for interfacing between each process and the operating system; a memory including one or more address spaces, there being an address space corresponding to each of the processes for use by the respective process; and a data communication stack for one of the processes, the stack being located in the address space corresponding to the respective process and having a descriptor allocated to it; the interface being arranged to analyse requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

In the context of this invention, the allocation of a descriptor to a stack may mean the association between the stack and the descriptor that results in the stack being responsible for performing operations related to that descriptor. Specific examples of such associations are given below.

The request could suitably be a Dup2( ) system call, and the changing of the descriptor allocated to the stack could suitably be carried out by means of a Dup2( ) system call. A failure of the changing of the descriptor by means of a Dup2( ) system call is preferably reported to the respective process as a failure of the request. Each process is preferably associated with a corresponding stack. The descriptor allocated to the stack could be flagged by the operating system as being allocated to a stack. The stack could suitably be implemented at user-level. The interface may be a library, and it may be an application program interface.

According to a second aspect of the present invention there is provided an interface for a data processing system comprising an operating system for supporting processes, the operating system being arranged to output data by addressing the data to a descriptor corresponding to the intended destination of the data and a memory including one or more address spaces, there being an address space corresponding to each of the processes for use by the respective process; and a data communication stack for one of the processes, the stack being located in the address space corresponding to the respective process and having a descriptor allocated to it; the interface being for interfacing between each process and the operating system and being arranged to analyse requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

According to a third aspect of the present invention there is provided a data carrier storing program data defining an interface as defined above. According to a fourth aspect of the present invention there is provided a method for processing requests sent by processes in a data processing system comprising: an operating system for supporting processes, the operating system being arranged to output data by addressing the data to a descriptor corresponding to the intended destination of the data; an interface for interfacing between each process and the operating system; a memory including one or more address spaces, there being an address space corresponding to each of the processes for use by the respective process; and a data communication stack for one of the processes, the stack being located in the address space corresponding to the respective process and having a descriptor allocated to it; the method comprising the steps of analyzing requests to alter the allocation of a descriptor sent by the processes towards the operating system to identify whether such a request relates to altering the allocation of the descriptor allocated to the stack; and if it does, allocating a different descriptor to the stack and subsequently permitting the request to be processed.

Figure 17:
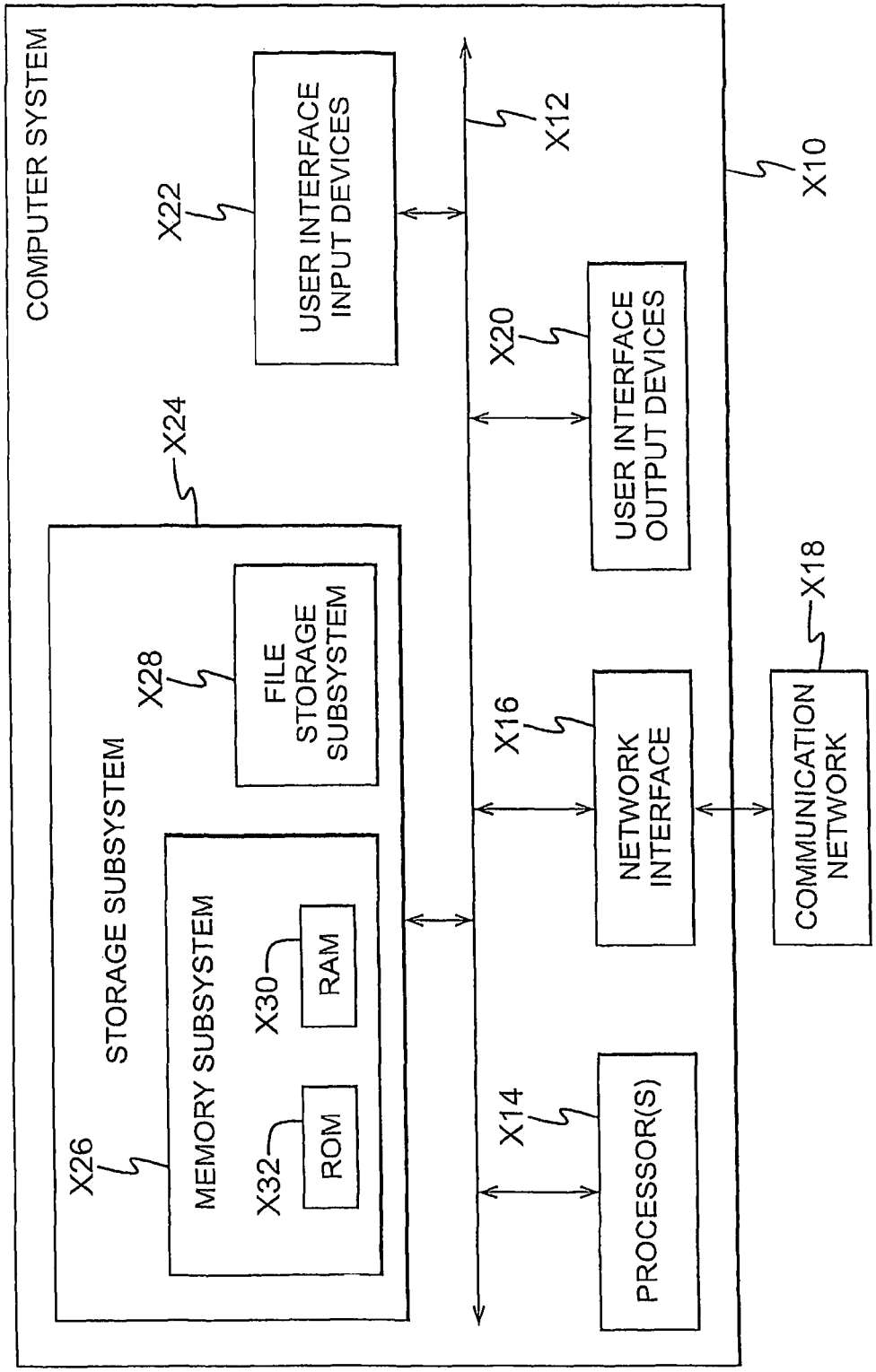
FIG. 17 shows hardware suitable for use with embodiments of the invention.

FIG. 17 is a simplified block diagram of a computer system X10 suitable for use with embodiments of the present invention. Computer system X10 typically includes at least one processor X14 which communicates with a number of peripheral devices via bus subsystem X12. These peripheral devices may include a storage subsystem X24, comprising a memory subsystem X26 and a file storage subsystem X28, user interface input devices X22, user interface output devices X20, and a network interface subsystem X16. The input and output devices allow user interaction with computer system X10. Network interface subsystem X16 provides an interface to outside networks, including an interface to communication network X18, and is coupled via communication network X18 to corresponding interface devices in other computer systems. Communication network X18 may comprise many interconnected computer systems and communication links. These communication links may be wireline links, optical links, wireless links, or any other mechanisms for communication of information. While in one embodiment, communication network X18 is the Ethernet, in other embodiments, communication network X18 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices X22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system X10 or onto computer network X18.

User interface output devices X20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system X10 to the user or to another machine or computer system.

Storage subsystem X24 stores the basic programming and data constructs that provide the functionality of certain embodiments of the present invention. For example, the various modules implementing the functionality of certain embodiments of the invention may be stored in storage subsystem X24. These software modules are generally executed by processor X14.

Memory subsystem X26 typically includes a number of memories including a main random access memory (RAM) X30 for storage of instructions and data during program execution and a read only memory (ROM) X32 in which fixed instructions are stored. File storage subsystem X28 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem X28. A host memory contains, among other things, computer instructions which, when executed by a processor subsystem, cause the computer system to operate or perform functions as described herein.

Bus subsystem X12 provides a mechanism for letting the various components and subsystems of computer system X10 communicate with each other as intended. Although bus subsystem X12 is shown schematically as a single bus, alternative embodiments of the bus subsystem may use multiple busses.

Computer system X10 itself can be of varying types including a personal computer, a portable computer, a workstation, a computer terminal, a network computer, a television, a mainframe, or any other data processing system or user device. Due to the ever-changing nature of computers and networks, the description of computer system X10 depicted in FIG. 17 is intended only as a specific example for purposes of illustrating the preferred embodiments of the present invention. Many other configurations of computer system X10 are possible having more or less components than the computer system depicted in FIG. 17.

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral device must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

FIG. 15 shows components implementing a TCP stack for use in accordance with embodiments of the present invention. Layers of the stack include an application 1 and a socket 2 provided by a socket library. In general, a library is a collection of routines. The term is commonly used to refer to a collection of standard programs and routines that can be used by processes running in a computer system. In the context of FIG. 15, a socket library is an application program interface (API) for building software applications. The socket library can carry out various functions, including creating descriptors and storing information. Additionally, there is an operating system 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 15. The hardware could be a network interface card (NIC).

In this arrangement there can be one user-level TCP stack 5 for each application that requires one. This can provide better performance than if a stack is shared between applications. Each stack is located in the same address space as the application that it serves. In alternative implementations, multiple applications can use a single stack, or a stack could be split so that there are multiple stacks per application if necessary.

The socket library maintains a table 40, shown in FIG. 16, incorporating identifiers of file descriptors and their ownership. In general, the term ownership applies to control of access to elements within a computer system. For example, a network interface 6 (typically a port on a network interface card) could link a data processing system to a series of other computers, and the data processing system could be similarly linked by a further network interface to another series of computers. If it is desired to send a packet of data from the data processing system to a specific one of the computers, the correct network interface must be selected in order to successfully transmit the packet to the correct computer. In this case, the term "ownership" refers to the identity of the interfaces. Thus "ownership" can refer to the allocation of a resource to an entity such as a process or a stack, which may imply that access to that resource is limited to that entity. It is used in this general sense herein, and in some embodiments of the invention the term "owner" can refer more specifically to the process that has responsibility for managing a resource associated with a file descriptor. Ownership of a file descriptor by a stack can refer to the responsibility that the stack has for performing operations on behalf of a process indicating that file descriptor in instructions sent by the process. Resources could suitably include memory, protocol processing stacks, data structures, NICs and NIC drivers.

In embodiments of the invention, the right of a process to access a resource is defined by the allocation (or ownership) of file descriptors. A file descriptor can be allocated by the OS to a process. The file descriptor is typically associated with a particular resource or a plurality of resources. By allocating the file descriptor to the process, access to the corresponding resources by the process is enabled. Ownership of a file descriptor by a process, and thus access to the resource or resources corresponding to the descriptor, may (although need not) imply unique access of the process to the resource (s). For example, a process may own a file descriptor identifying an established communication channel to a remote computer. The file descriptor may be the only file descriptor in the data processing system that is assigned to that communication channel. The OS may be configured to deny ownership of that file descriptor to any other processes concurrently, thereby providing sole access of the communication channel to the process. However, in other embodiments, multiple processes may be provided with concurrent ownership of the same file descriptor.

In the present example illustrated by FIG. 15, the computer system has a kernel (K) 4 and a proprietary user-level stack 5 which will be referred to (by way of example only) as a Level 5 (or L5) stack. The L5 stack is associated with its own library which is interposed between them. The ownership of file descriptors in use in the system is defined according to which network interface the file descriptor is associated with. The descriptor table maintained by the socket library indicates whether each descriptor is owned by L5, owned by K, or of ownership currently unknown to the socket library. Thus, in this case, the ownership can have three values: L5; K; or unknown/indeterminate. These values could be indicated explicitly or by way of binary flags. Exemplary entries in the table 40 are shown in FIG. 16. The descriptor numbers are listed in the left column and an indication of the ownership of each descriptor (as determined by the socket library) is shown in the right column. Thus, the table shows that descriptor number 0 has been determined to be owned by L5, the ownership of descriptor numbers 3 and 6 is currently unknown to the socket library, and descriptor number 4 is owned by the kernel. The table 40 is preferably stored securely such that users cannot access it directly and corrupt it by changing pointers in the table, for example by using read only memory mapping. It may suitably be stored in user address space.

Figure 14:
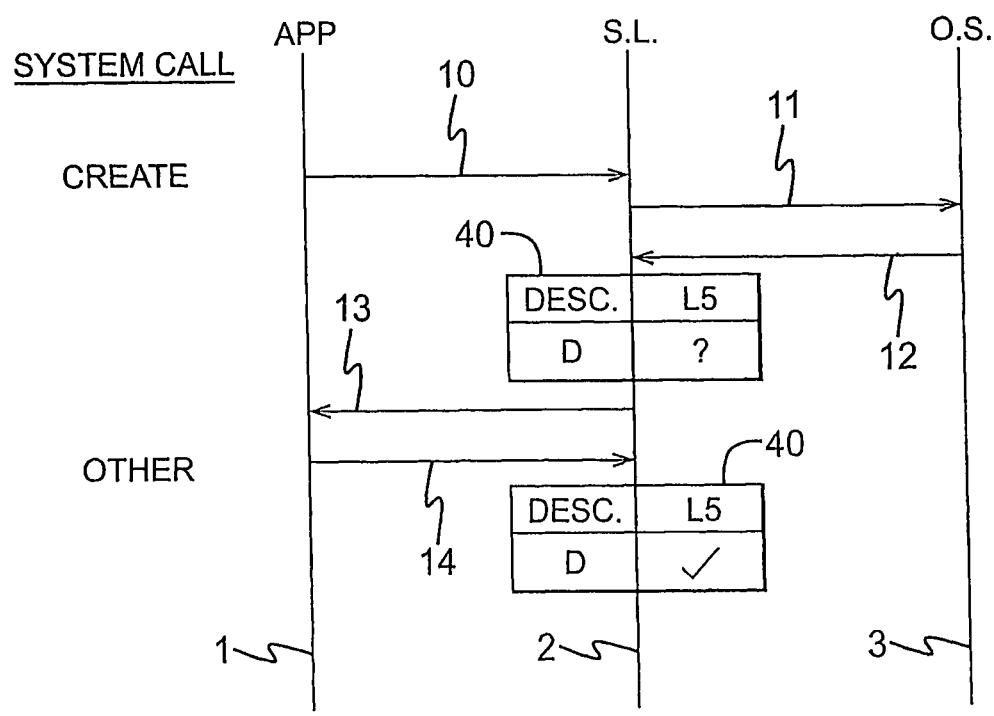
FIG. 14 represents a series of operations in a computer system.

In FIG. 14, a series of operations is illustrated. An application 1 invokes a socket( ) syscall 10 through the socket API 2, requesting that a new file descriptor be created. This could alternatively be achieved for example by using an open( ) call. In the present example, the application could be a webserver which creates a new descriptor which accepts new connections and then forks( ) a new process for each concurrent user. In the example, the server is initialising, and so a socket( ) call is made by the application.

At step 11 the socket library, which may be a standalone library or alternatively its functionality could be incorporated in a single system library such as libc, invokes a syscall trap which causes execution to switch to the operating system. The operating system determines the syscall source and executes internal socket creation code within its network subsystem. This code will request a new file descriptor. The operating system checks its descriptor table and selects a descriptor D suitable for this application and then assigns it to the new file associated with the new user. An identifier of the selected descriptor D is then sent in step 12 by the operating system 3 to the socket 2.

In prior art systems, the passing of the syscall from the application to the socket library, and the invoking of the resulting system call at the socket is generally unhindered. In contrast, in the present system, the call is intercepted before it reaches the socket library. The intercepted message 12 is checked by the L5 socket library, and an identifier of the descriptor D is entered in the table 40, with an initial indication of indeterminate (unknown) ownership. An extract of the table 40 is shown below step 12 in FIG. 14.

An identifier of the descriptor D in the message 12 is then transmitted to the requesting application 1 in step 13. The application may then include this descriptor in further syscalls which it transmits, enabling the relevant resource to be identified.

In this embodiment, a network route table is maintained by the operating system 3 storing arguments and their associated routes including interfaces within the routes. The network route table typically stores network subnet address masks and their associated network interfaces. A given network address is matched against the table in such a way that the most specifically defined route can be chosen.

This table contains all external network routing rules for the computer system. The table is also associated with an API which enables entries in the table to be added or deleted. Because the route table is held in the OS a user-level stack would waste time making system calls to determine the route of packets being transmitted. To avoid this a local copy of the route table (and other control plane tables such as the list of network interfaces and the address resolution protocol (ARP) table) is maintained in the context of the user-level application. In the system of this example, the L5 stack is registered with the operating system to receive updates when the route table changes. The table is thereby copied into the L5 stack and if an application's route changes, the relevant information will be relayed to the L5 stack.

The L5 user-level stack provides a "look up route" function which, on receiving a request, can return details of whether or not a specified route goes through an interface associated with the L5 stack (in this example an L5 interface). This function will check a generation count to determine whether its cached route table state is still valid. If so it can use cached state, otherwise it needs to either make a system call or consult shared memory pages onto valid route table entries.

In step 14, another syscall is sent from the application 1. In this example it is a connect( ) syscall, specifying an address for connection which could be in another machine. The socket library 2 intercepts the message 14, determines the type of syscall and looks it up in a further table. If it is a type from which it will not be possible to determine the ownership of a descriptor, no further processing of the message is performed to establish the ownership. An entry already exists in the table 40 for the descriptor D, and the ownership indicated in the table will remain unchanged, as indeterminate. Information and the descriptor D in the message 14 will then be checked by the socket 2 to establish whether the message should be passed to the kernel or the L5 stack, and it will then be transmitted within the system to the appropriate interface.

On the other hand, if the syscall 14 is determined by the socket library to be of a type that could identify the ownership of the descriptor, the syscall will be further analysed. In the present example, the message is a connect request and so it will be further analysed. This analysis includes identifying the descriptor D and any arguments included in the message. The arguments can then be analysed by the socket library by means of a "look up route" request. The route table copied into the L5 stack will then be checked and an associated interface can thereby be identified. The ownership of the descriptor D is assumed to be the same as that of the interface, and the ownership data in the table 40 against descriptor D can then be updated. The socket library can thus identify whether the descriptor should be passed to the operating system 3 (or, more specifically, the kernel 4) or to the proprietary user-level stack 5. In the present example, the syscall 14 is determined to be directed to a L5 interface, and the descriptor D is therefore taken to be a L5 descriptor. The table 40 is updated with a positive indication of L5 ownership, as shown below step 14 in FIG. 14, and the syscall will be passed to the L5 stack which will perform the required operation within the application context.

When a subsequent message identifying descriptor D passes through the socket 2, the socket library can simply determine the descriptor from the message and look up that descriptor in the locally stored table 40 to determine its presumed ownership. Messages incorporating a descriptor owned by L5 will be intended to be passed directly down from the socket 2 to the L5 user-level stack 5 shown in FIG. 15. Because the ownership of the descriptor D is determined from the table 40 as being L5, messages intercepted by the socket library incorporating an identifier of the descriptor D will be passed directly down to the L5 stack 5 without first being sent to the operating system 3. Therefore, by means of embodiments of the present invention, only a simple analysis of a message passing through the socket library is required in order to be able to establish the appropriate part of the stack to which to pass the message. The high overhead in processing instructions to determine a path is thereby avoided. Preferably, if the ownership of a descriptor is recorded by the socket library as indeterminate, any message incorporating that descriptor will be sent to the operating system by default.

Figure 18:
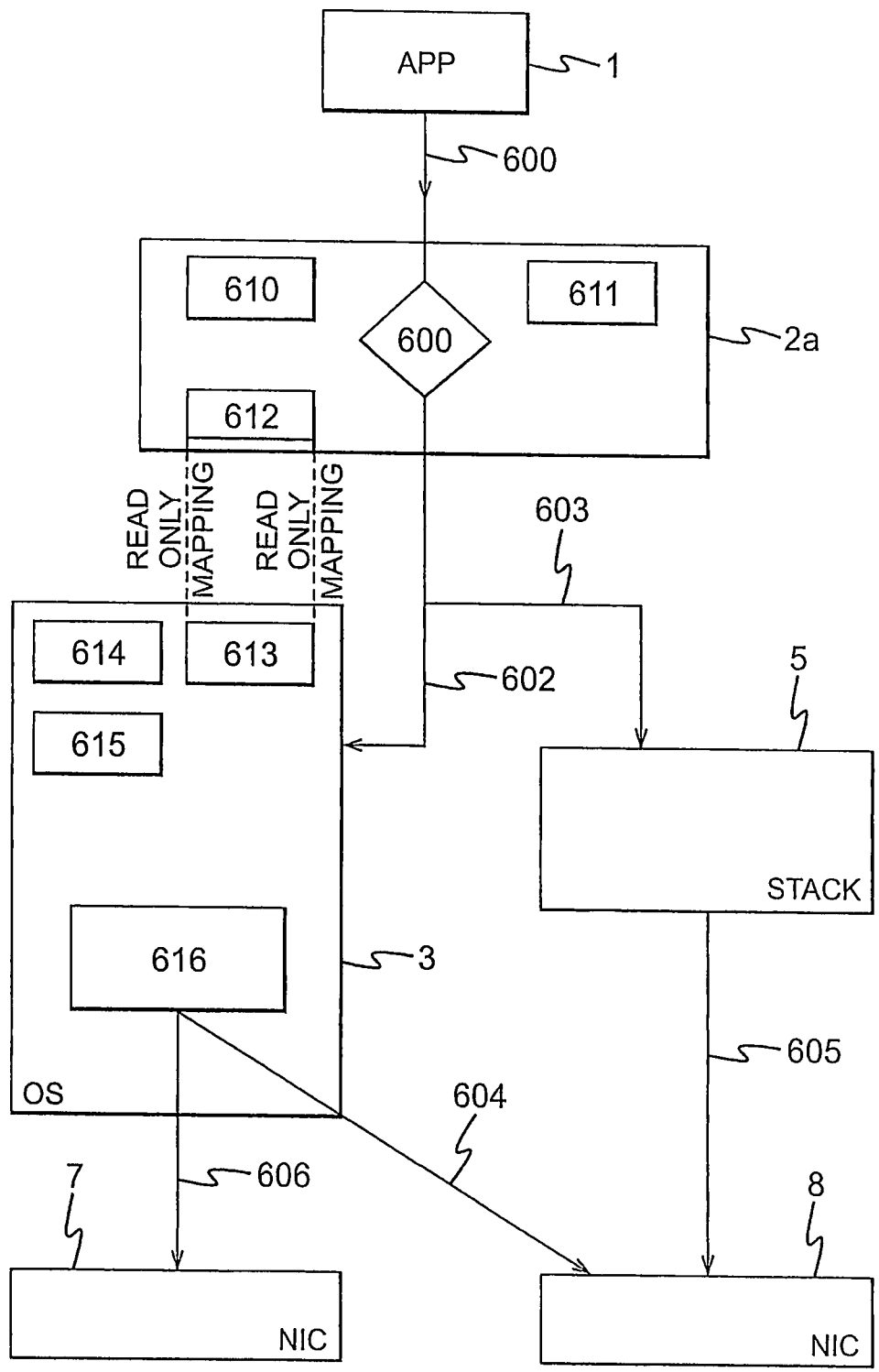
FIG. 18 is a schematic representation of a routing mechanism.

FIG. 18 illustrates the routing procedure described above in more detail. An application 1 issues a syscall or other message 600 within a data processing system comprising a user-level stack 5, an operating system 3 and NICs 7 and 8. In this example the message is a request (such as a send( ) syscall) for the transmission of data to a remote device. The message 600 is intercepted by an interception layer 2a. The interception layer may be a library (such as the socket library 2 of FIG. 14) but the functionality of the interception layer could be implemented in any suitable way.

A decision 609 is taken by the interception layer 2a in order to determine the subsequent routing of the message 600 within the data processing system. Specifically, a descriptor table 610 listing the ownership of file descriptors in use in the data processing system is checked by the interception layer. The table could be of the form shown in FIG. 16, but more generally can be any data structure holding information detailing the allocation of the file descriptors as described above. If the interception layer determines that the file descriptor is owned by the user-level stack 5 then the message 600 is routed directly to the stack by path 603. The message is then processed by user-level transport routines and data is passed by path 605 to a NIC 8 associated with the stack 5. In a specific example, the NIC 8 could be a proprietary NIC that is supported by corresponding code in the stack 5.

If, at decision 609, the interception layer instead determines that the file descriptor is owned by the kernel then the message is routed by path 602 to the OS 3. Kernel transport routines 616 perform the required protocol processing on the data indicated in the message 600, and the data is then passed by path 606 or path 604 to a NIC for transmission over a network. Instead of being separate pieces of hardware, the items shown as 7 and 8 in FIG. 18 could be separate ports on a single piece of hardware, for example arranged for transmitting data processed by the kernel and by the user-level stack 5 respectively.

To enable efficient operation of the above routing mechanism, the sharing of routing information between the OS and the stack 5 as described above is desirable.

FIG. 18 shows a routing table 615 held by the OS, together with a copy of that routing table 611 held locally by the interception layer 2a. The OS also has a table (or other data structure) 614 maintaining details of the allocation of all file descriptors in use in the system, as described above. A local table 610 is held by the interception layer 2a storing a list of file descriptors in use together with an indication of their ownership as determined by the interception layer during an interception process as described above in relation to FIG. 14. Furthermore, a generation count 613 is maintained by the OS, and this is mapped (preferably in a read-only manner) onto a similar count 612 at the interception layer.

Figure 19:
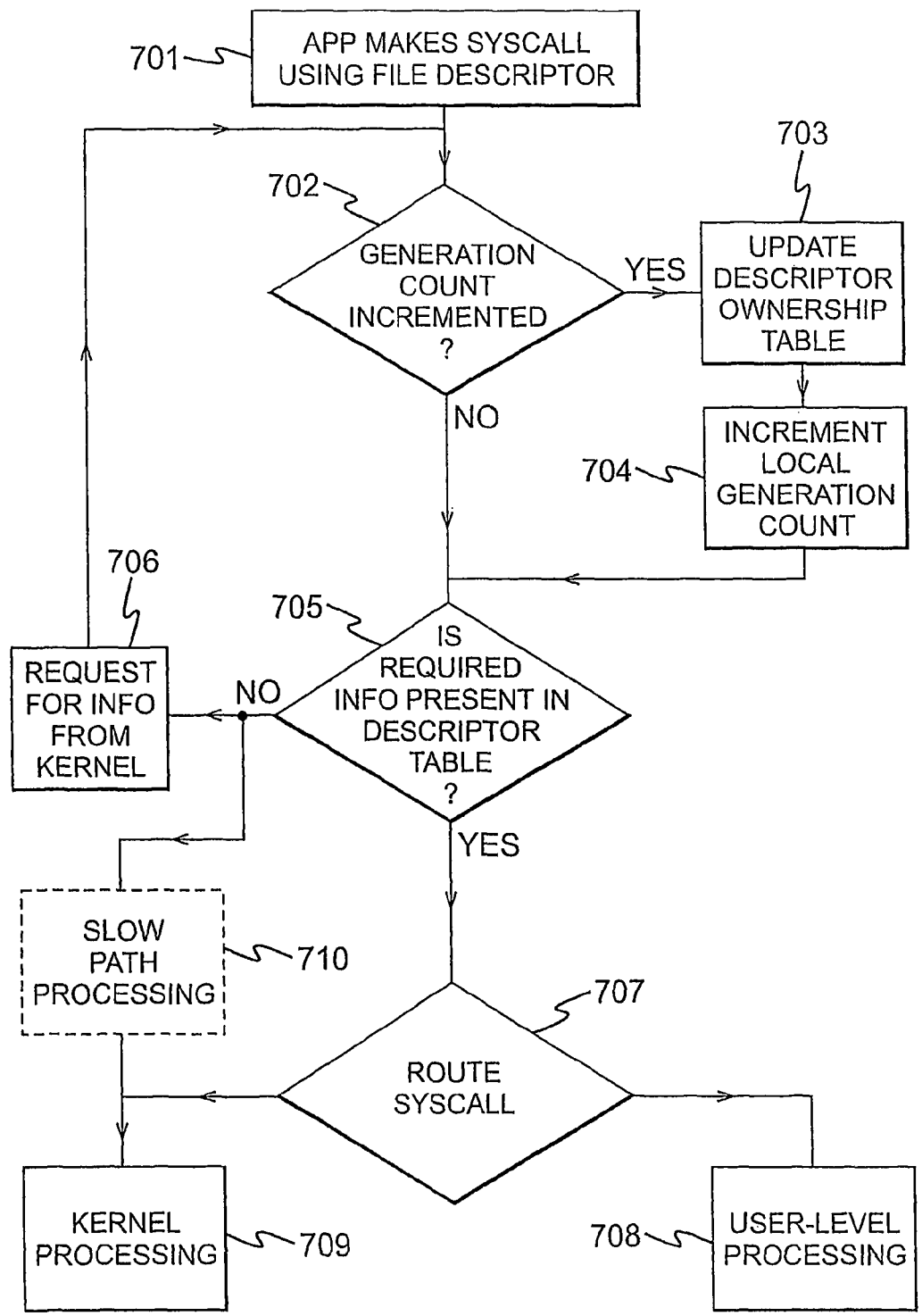
FIG. 19 is a flow diagram illustrating the routing mechanism of FIG. 18.

FIG. 19 shows more detail of the routing mechanism illustrated in FIG. 18. In a step 701 an application issues a message such as a syscall. The message is intercepted by an interception layer 2a such as a socket library, and a check is made in step 702, preferably by reference to the local generation counter 612, to determine whether the information currently held in the interception layer's descriptor ownership table 40 is up-to-date. If the generation counter has been incremented since the table 40 was last known to be up-to-date, then the table may need to be refreshed, as discussed below in the discussion of routing and policy changes. In this case, the currently stored table is updated in step 703 and the local generation counter 612 is incremented in step 704 to indicate that a change has been made to the table 40. Updated ownership information can be acquired by the interception layer by means of the mechanism described above with reference to FIG. 14. The routing mechanism can then proceed in step 705, discussed below.

In one embodiment, generation counters could be provided on a per-descriptor basis such that the entire descriptor table 40 need not be updated if the routing requirements have changed in respect of one descriptor only.

If at check 702 it is determined by the interception layer that the information held in the descriptor table 40 is up-to-date then that information may be used, and the mechanism proceeds to step 705.

In step 705, the interception layer checks the content of the descriptor table 40 to determine whether it has identified the ownership of the file descriptor referenced in the message 701. If so then the routing can proceed in step 707 by the fast-path method described above, whereby the ownership of the descriptor is used as a representation of the desired path of the message 701 as indicated by the routing table 615 of the OS (or the local copy 611 at the interception layer 2a).

If at step 705 it is determined that the descriptor table 40 does not contain the ownership of the file descriptor referenced in the message 701 then alternative processing is required for the message. This may involve requesting information from the kernel in a step 706, or it may involve routing the message according to a default slow-path procedure, suitably passing it in a step 710 to the OS which can then look up the required route for that message using its routing table 615.

Referring again to the descriptor table 40 illustrated schematically in FIG. 16, when a file is to be closed, a destructor syscall (usually close( )) is sent from the application 1 and intercepted by the socket library 2. The socket library can then identify that the descriptor is to be destroyed and remove the entry for that descriptor from the table 40. Then, when the descriptor is subsequently re-used by the operating system and assigned to a new process, the socket library can intercept the message from the operating system identifying the newly-assigned descriptor, as described above in relation to step 12 of FIG. 14. Alternatively, the entry could remain in the table and the associated indication of its ownership could be modified to show that its ownership is unknown to the socket library. Alternatively, the default setting for a descriptor's ownership could be "operating system".

The information stored in the table 40 may become obsolete when routing instructions within the computer system change. This could happen as a result of policy changes, for example when an application no longer runs with Level 5, or, more commonly, as a result of load balancing decisions within the computer system or other route updates caused by network topology changes. The information in the table 40 should be checked when such a change occurs. A convenient way of arranging the checking procedure is to reset a descriptor's ownership to indeterminate (or K) when such a change occurs so that until the correct new ownership information can be obtained a full processing operation will be carried out for the routing of messages to the operating system or the L5 stack via the socket 2. More generally a single generation counter is associated with each user-level socket state. Incrementing this counter will cause the L5 user-level stack to leave its fast path processing and determine the state change.

In a typical system as shown in FIG. 15, each application 1 has its own user-level TCP stack 5 by which it can communicate with its hardware 6. This enables shorter processing times because the application need not share the stack with other applications. As stated above, the stack 5 is in the same address space as its corresponding application. Additionally, each stack 5 is associated with a dedicated driver (not shown) in the kernel 4 of the operating system. In this arrangement, when the application 1 attempts to open a descriptor that is being used by the stack 5, for example a descriptor for accessing the TCP driver in the kernel 4, the operating system 3 cannot identify that there is a conflict because the stack 5 and the application 1 are in the same address space. The conflict arises due to the fact that in order for the L5 stack to operate it requires operating system descriptors, and these descriptors must be allocated from the same address space as the descriptors used by the application. However, the application has no a priori knowledge of the existence of the L5 stack.

A detailed example of file descriptor ownership will now be given in the context of the invention. A file descriptor identifying a port of a network interface is allocated to a process of an application. The application is communicating with a data processing device remote from the system on which the application is running. The process therefore requires access to the relevant network interface port to enable communication of data between the host system and the remote device. The ownership of the file descriptor by the process permits such access. In this example, when the process wishes to transmit data to the remote device, it issues an appropriate syscall towards the OS. The interfacing library determines from its descriptor table 40 (illustrated here by a designation of "L5") that the transmit operation identified in the syscall is to be processed by the user-level stack 5. Thus, in the terminology of the present application, it may be said that the stack 5 owns the file descriptor identifying the network interface port, or that the file descriptor is allocated to the stack 5. In other words, the stack is to perform the processing (in this case, network protocol processing) of an instruction sent by the process and indicating the file descriptor. It may also be said that the file descriptor is owned by, or allocated to, the process sending the transmit instruction.

A specific example in accordance with the present invention will now be described. The operating system 3 allocates descriptor number 42 for use by the L5 TCP stack 5. The application 1 then sends a Dup2(X,42) call, requesting that descriptor 42 becomes a copy of descriptor X. If this instruction were executed by the operating system it would cause a conflict because descriptor 42 is already in use to identify the stack. Normally such a conflict would be avoided by the operating system preventing one process from having access to a descriptor that is already in use by another process. However, in this case the application and the user-level stack 5 occupy the same address space as far as the operating system is concerned, and so the operating system could not normally allow this Dup2( ) call to proceed, unless the application were to first close the existing resource having descriptor 42. To avoid such a conflict, the socket library 2 intercepts Dup2( ) calls and identifies whether they request a descriptor assigned to the stack to be redefined. The socket library checks in the table 40, which additionally includes a flag indicating whether each descriptor is a private L5 user-level stack descriptor, and if it determines that there will be a clash, a series of operations is carried out by the socket library.

Thus, the socket library intercepts the syscall Dup2(X,42) from the application 1, which is an attempt to transform descriptor 42 into a duplicate of the descriptor X. The socket library checks the table 40 for a flag indicating that 42 is private to the L5 stack. It determines that it is, and blocks the application's thread, as would happen for any syscall. The library obtains a lock on descriptor 42 to prevent other actions being carried out in relation to it. The library then sends a Dup2(42,Y) call to the operating system, requesting that the current definition of descriptor 42 is duplicated at some unused descriptor Y, so that the stack can subsequently operate with descriptor Y.

If the Dup2(42,Y) call fails, for example due to an internal error within the stack 5, the socket library forges a message to the application 1 to indicate that the Dup2(X,42) call from the application failed. On the other hand, if the Dup2(42,Y) call succeeds, the application's thread is released, and the Dup2 (X,42) call can be forwarded by the socket library to the operating system, resulting in the duplication of descriptor X in descriptor 42. When the socket library receives a response from the operating system indicating that the Dup2(42,Y) call was successful, it forwards a response to the application, which the application interprets as being confirmation that its Dup2(X,42) call succeeded. The application can then use descriptor 42 and the stack can use the new descriptor Y, and the potential conflict is thus prevented.

The sequence of operations described above can involve a high processing overhead, so to inhibit an application from requesting the use of a descriptor that is in use by the stack, it is preferred that such a descriptor is marked by the operating system as reserved. The operating system would then be unlikely to inform an application that such a descriptor is available and so it is unlikely that the application will request the use of such a descriptor.

The dup2( ) instruction is an example of an instruction to duplicate a descriptor that is used in the Unix and Linux operating systems. Other operating systems may be responsive to other instructions to perform functionally equivalent duplication of descriptors, and similar techniques can be applied to avoid conflicts in those operating systems too.

The present invention has been described with reference to an implementation for transmitting and receiving data over a network. However, it is applicable in other situations such as, more generally, where a resource that is identified by a descriptor and is configured without the direct knowledge of an application shares an address space (or other means by which it can be identified by the operating system for the purpose of preventing clashes on execution of duplication instructions) with that application. Examples of such situations could involve the provision of a user-level resource for interfacing with a storage device or for buffering data to an on-board co-processor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Transmitting Data

This invention relates to the transmission of data in computer systems. In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

Figure 20:
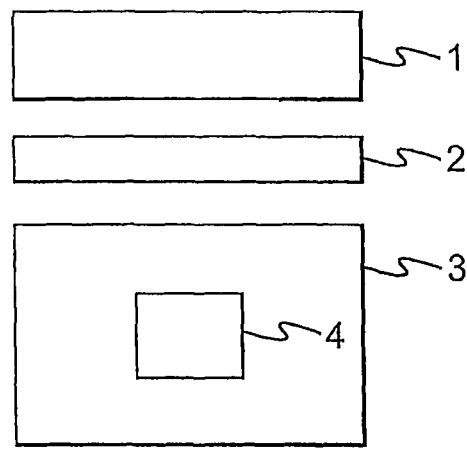
FIG. 20 shows a prior art computer system.

FIG. 20 represents equipment capable of implementing a prior art protocol stack, such as a transmission control protocol (TCP) stack in a computer connected to a network. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

When a network related application program interface (API) call is made through the socket library this causes a system call to be made, which creates (or opens) a new file descriptor. For example the accept( ) system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. An alternative architecture is a user-level architecture, as described in WO 2004/079981 and the applicant's copending PCT application claiming priority from GB 0408876.1. In a user-level architecture at least some of the functions usually performed by the operating system are performed by code running at user level. In a user-level architecture at least some of the state of the function can be stored by the user-level code. This can cause difficulties when an application performs an operation that requires the operating system to interact with or have knowledge of that state.

In embodiments of the present invention syscalls passing through the socket can be analysed to establish the file descriptor and any information identified in the syscall that indicates the path by which the syscall is to be directed, and decisions can thereby be made by the socket so that the syscall can be transmitted in a suitable way from the socket.

An example of a syscall is Dup2(a,b), which has the effect of duplicating the file or other resource represented by descriptor "a" and creating a new resource represented by descriptor "b" and having the same properties. One example of when such a call might be useful is when a descriptor that has a system-wide significance (for example the descriptor that maps on to error output—commonly descriptor #2) is to be redirected on to some other file or device.

Other examples of syscalls are fork( ) and exec( ). A fork( ) call typically creates a new process (child) from the old one (parent) which initially shares all state including memory mappings and file-descriptors. After a successful fork( ), two copies of the original code will be running. An exec( ) call can then be requested for the child process. This will replace the current process image with a new process image, but details of the child process can be preserved. For example, specific file descriptors can be preserved in the child and (often) closed by the parent; thus handing over control of a file descriptor from a parent to a new child process.

According to a first aspect of the present invention there is provided a method of compiling a data structure in a computer system, the computer system being arranged to perform protocol processing and transmit data via an interface on the basis of instructions in accordance with a route, the method comprising: receiving a first instruction including an indication of a descriptor; determining a route indicated by the first instruction; identifying an interface within the determined route; attempting to determine the ownership of the interface; and causing an entry to be made in the data structure, the entry including an identifier of the descriptor and a state of the descriptor, wherein the state represents the result of the attempting step.

The method is preferably performed by a socket library in the computer system. The socket library preferably contains a TCP/IP stack.

The state may be a state from the list comprising A, B and C, where: A indicates ownership by a kernel of an operating system in the computer system; B indicates ownership by another owner; and C indicates unknown ownership. The first instruction could suitably be a system call. The descriptor is preferably a file descriptor. The determined ownership of the interface could conveniently be taken to be the ownership of the descriptor. The step of attempting to determine the ownership of the interface preferably includes accessing system-wide rules defining routes for transmitting data.

The method could further comprise: receiving a second instruction including an indication of the descriptor; accessing the data structure to determine the state of the descriptor; and routing the second instruction based on the determined state of the descriptor.

The method could additionally comprise: receiving an indication that the ownership of the descriptor may have changed; and changing the entry in the data structure to indicate the state of the descriptor as C.

The method could further comprise updating the state of the descriptor in the data structure by: receiving a third instruction including an indication of the descriptor; determining a route specified by the third instruction; identifying an interface within the determined route; attempting to determine the ownership of the interface; and based on the determined ownership of the interface, updating the said entry in the data structure to indicate the current ownership of the descriptor.

According to a second aspect of the present invention there is provided a data structure accessible by a socket library in a computer system, the data structure comprising one or more entries each including an identifier of a descriptor and a state of the descriptor, wherein the state represents the ownership of the descriptor, and wherein accessing the data structure can provide routing information relating to the descriptor.

According to a third aspect of the present invention there is provided a method of routing data in a computer system, the computer system being arranged to perform protocol processing and transmit data via an interface on the basis of instructions in accordance with a route, the method comprising: receiving a first instruction including an indication of a first descriptor; accessing a data structure storing, for each of one or more descriptors, an identifier of the descriptor and a state of the descriptor, wherein the state represents the ownership of the descriptor; determining the state of the first descriptor; in accordance with the determined state, determining a route; and transmitting the first instruction in accordance with the determined route. The method is preferably performed by a socket library in the computer system. The data structure is preferably stored at the socket library.

According to a fourth aspect of the present invention there is provided a program for programming a computer system to compile a data structure, the computer system being arranged to perform protocol processing and transmit data via an interface on the basis of instructions in accordance with a route, the program being arranged to cause the computer system to compile the data structure by a method comprising: receiving a first instruction including an indication of a descriptor; determining a route indicated by the first instruction; identifying an interface within the determined route; attempting to determine the ownership of the interface; and causing an entry to be made in the data structure, the entry including an identifier of the descriptor and a state of the descriptor, wherein the state represents the result of the attempting step.

According to a fifth aspect of the present invention there is provided a computer system programmed with a program as defined above. According to a sixth aspect of the present invention there is provided a data carrier carrying a program as defined above.

Figures 22, 23:
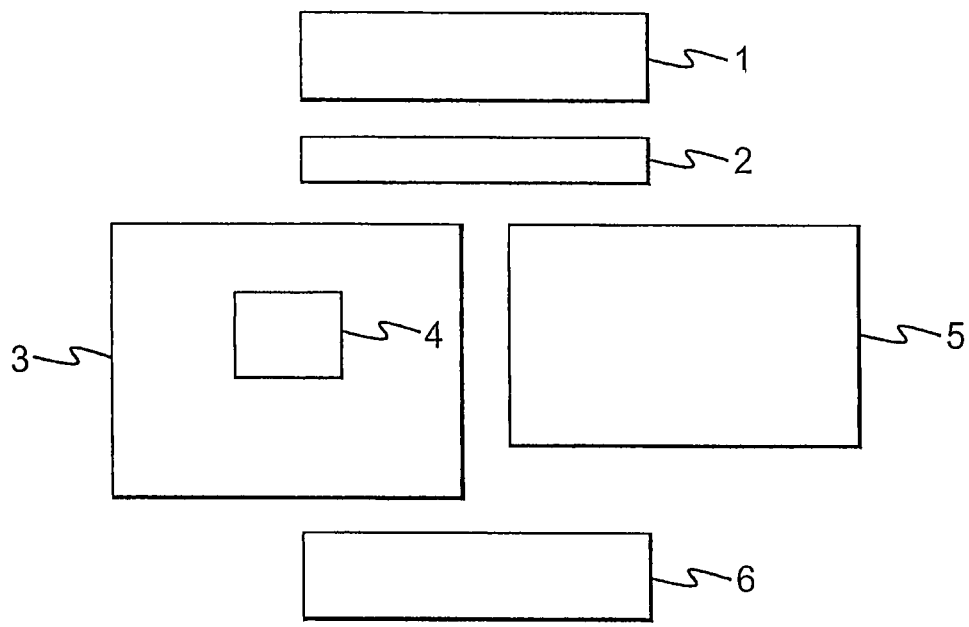
FIG. 22 shows a computer system in accordance with embodiments of the present invention.
FIG. 23 shows a descriptor table.

FIG. 22 shows components implementing a TCP stack for use in accordance with embodiments of the present invention. Layers of the stack include an application 1 and a socket 2 provided by a socket library. The socket library is an application program interface (API) for building software applications. The socket library can carry out various functions, including creating descriptors and storing information. Additionally, there is an operating system 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 22. The hardware could be a network interface card (NIC). The system shown in FIG. 22 is capable of performing protocol processing. This involves the processing of data packets and of the protocols according to which the data packets are transmitted within computer networks.

In this arrangement there can be one user-level TCP stack 5 for each application that requires one. This can provide better performance than if a stack is shared between applications. Each stack is located in the same address space as the application that it serves.

The socket library maintains a table 40, shown in FIG. 23, incorporating identifiers of file descriptors and their ownership. In general, ownership applies to control of access to elements within a computer system. For example, a network interface 6 (typically a port on a network interface card) could link a data processing system to a series of other computers, and the data processing system could be similarly linked by a further network interface to another series of computers. If it is desired to send a packet of data from the data processing system to a specific one of the computers, the correct network interface must be selected in order to successfully transmit the packet to the correct computer. In this case, the term "ownership" refers to the identity of the interfaces. Thus "ownership" typically refers to the allocation of a resource to an entity such as a process, which may imply that access to that resource is limited to that entity.

In the present example illustrated by FIG. 22, the computer system has a kernel (K) 4 and a proprietary user-level stack 5 which will be referred to (by way of example only) as a Level 5 (or L5) stack. The L5 stack is associated with its own library which is interposed in the system. The ownership of file descriptors in use in the system is defined according to which network interface the file descriptor is associated with. In this case, the ownership can have three values in: L5; K; or unknown/indeterminate. These values could be indicated explicitly or by way of binary flags. The descriptor table maintained by the socket library indicates whether each descriptor is owned by L5, owned by K, or of unknown ownership. Exemplary entries in the table 40 are shown in FIG. 23. The descriptor numbers are listed in the left column and an indication of the ownership of each descriptor is shown in the right column. Thus, the table shows that descriptor number 0 has been determined to be owned by L5, descriptor numbers 3 and 6 are of unknown ownership and descriptor number 4 is owned by the kernel. The table 40 is preferably stored securely such that users cannot access it directly and corrupt it by changing pointers in the table.

Figure 21:
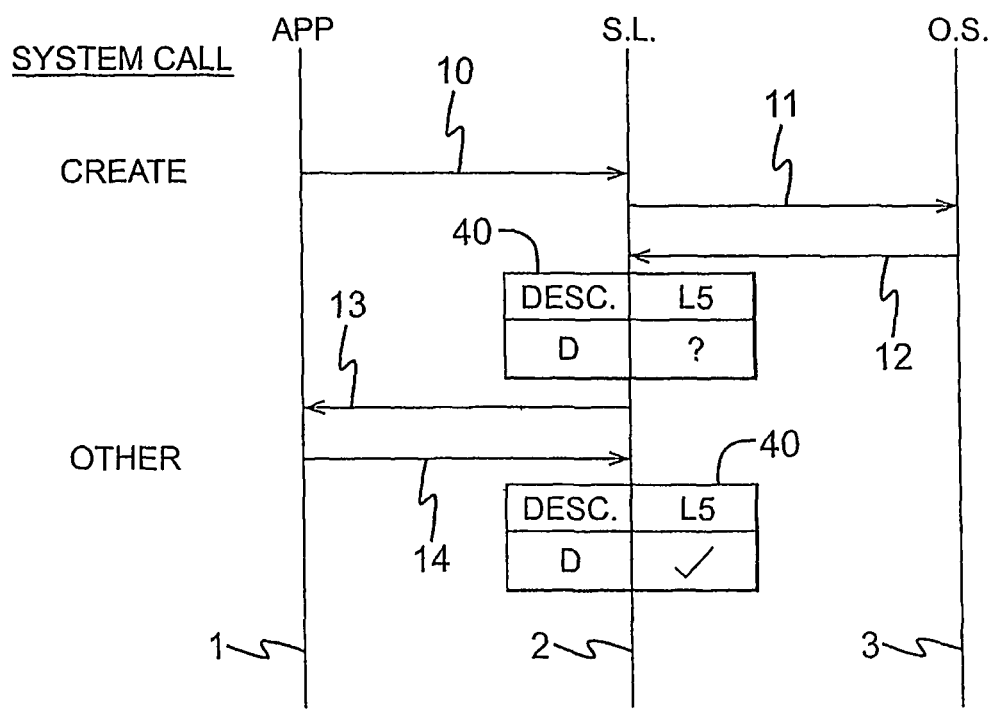
FIG. 21 represents a series of operations in a computer system.

In FIG. 21, a series of operations is illustrated. An application 1 invokes a socket( ) syscall 10 through the socket API 2, requesting that a new file descriptor be created. This could alternatively be achieved for example by using an open( ) call. In the present example, the application could be a webserver which creates a new descriptor which accepts new connections and then forks( ) a new process for each concurrent user. In the example, the server is initialising, and so a socket( ) call is made by the application.

At step 11 the socket library, which may be a standalone library or alternatively its functionality could be incorporated in a single system library such as libc invokes a syscall trap which causes execution to switch to the operating system. The operating system determines the syscall source and executes internal socket creation code within its network subsystem. This code will request a new file descriptor. The operating system checks its descriptor table and selects a descriptor D suitable for this application and then assigns it to the new file associated with the new user. An identifier of the selected descriptor D is then sent in step 12 by the operating system 3 to the socket 2.

In prior art systems, the passing of the syscall from the application to the socket library, and the invoking of the resulting system call at the socket is generally unhindered. In contrast, in the present system, the call is intercepted before it reaches the socket library. The intercepted message 12 is checked by the L5 socket library, and an identifier of the descriptor D is entered in the table 40, with an indication of indeterminate ownership. An extract of the table 40 is shown below step 12 in FIG. 21.

An identifier of the descriptor D in the message 12 is then transmitted to the requesting application 1 in step 13. The application may then include this descriptor in further syscalls which it transmits, enabling the relevant file to be identified.

Syscalls can be thought of as functions taking a series of arguments which cause execution of the CPU to switch to a privileged level and start executing the operating system. Here the syscalls are denoted 1 to N. A given syscall will be composed of a specific list of arguments, and the combination of arguments will vary depending on the type of syscall.

In this embodiment, a network route table is maintained by the operating system 3 storing arguments and their associated routes including interfaces within the routes. The network route table typically stores network subnet address masks and their associated network interfaces. A given network address is matched against the table in such a way that the most specifically defined route can be chosen.

This table contains all external network routing rules for the computer system. The table is also associated with an API which enables entries in the table to be added or deleted. Because the route table is held in the OS a user-level stack would waste time making system calls to determine the route of packets being transmitted. To avoid this a local copy of the route table (and other control plane tables such as the list of network interfaces and the address resolution protocol (ARP) table) is maintained in the context of the user-level application. In the system of this example, the L5 stack is registered with the operating system to receive updates when the route table changes. The table is thereby copied into the L5 stack and if an application's route changes, the relevant information will be relayed to the L5 stack.

The L5 user-level stack provides a "look up route" function which, on receiving a request, can return details of whether or not a specified route goes through an interface associated with the L5 stack (in this example an L5 interface). This function will check a generation count to determine whether its cached route table state is still valid. If so it can use cached state, otherwise it needs to either make a system call or consult shared memory pages onto valid route table entries. Thus, a change can be indicated in a two-step process. First incrementing a "generation counter" means that the socket library knows quickly that something has changed. Then, once off the fast path, the socket library can determine the new state.

In step 14, another syscall is sent from the application 1. In this example it is a connect( ) syscall, specifying an address for connection which could be in another machine. The socket library 2 intercepts the message 14, determines the type of syscall and looks it up in a further table. If it is a type from which it will not be possible to determine the ownership of a descriptor, no further processing of the message is performed to establish the ownership. An entry already exists in the table 40 for the descriptor D, and the ownership indicated in the table will remain unchanged, as indeterminate. Information and the descriptor D in the message 14 will then be checked by the socket 2 to establish whether the message should be passed to the kernel or the L5 stack, and it will then be transmitted within the system to the appropriate interface.

On the other hand, if the syscall 14 is determined by the socket library to be of a type that could identify the ownership of the descriptor, the syscall will be further analysed. In the present example, the message is a connect request and so it will be further analysed. This analysis includes identifying the descriptor D and any arguments included in the message. The arguments can then be analysed by the socket library by means of a "look up route" request. The route table copied into the L5 stack will then be checked and an associated interface can thereby be identified. The ownership of the descriptor D is assumed to be the same as that of the interface, and the ownership data in the table 40 against descriptor D can then be updated. The socket library can thus identify whether the descriptor should be passed to the operating system 3 (or, more specifically, the kernel 4) or to the proprietary user-level stack 5. In the present example, the syscall 14 is determined to be directed to a L5 interface, and the descriptor D is therefore taken to be a L5 descriptor. The table 40 is updated with a positive indication of L5 ownership, as shown below step 14 in FIG. 21, and the syscall will be passed to the L5 stack which will perform the required operation within the application context.

When a subsequent message identifying descriptor D passes through the socket 2, the socket library can simply determine the descriptor from the message and look up that descriptor in the locally stored table 40 to determine its presumed ownership. Messages incorporating a descriptor owned by L5 will be intended to be passed directly down from the socket 2 to the L5 user-level stack 5 shown in FIG. 22.

Because the ownership of the descriptor D is determined from the table 40 as being L5, messages intercepted by the socket library incorporating an identifier of the descriptor D will be passed directly down to the L5 stack 5 without first being sent to the operating system 3. Therefore, by means of embodiments of the present invention, only a simple analysis of a message passing through the socket library is required in order to be able to establish the appropriate part of the stack to which to pass the message. The high overhead in processing instructions to determine a path is thereby avoided. Preferably, if the ownership of a descriptor is indeterminate, any message incorporating that descriptor will be sent to the operating system by default.

When a file is to be closed, a destructor syscall (usually close( )) is sent from the application 1 and intercepted by the socket library 2. The socket library can then identify that the descriptor is to be destroyed and remove the entry for that descriptor from the table 40. Then, when the descriptor is subsequently re-used by the operating system and assigned to a new process, the socket library can intercept the message from the operating system identifying the newly-assigned descriptor, as described above in relation to step 12 of FIG. 21. Alternatively, the entry could remain in the table and the associated indication of its ownership could be modified to show that its ownership is unknown. Alternatively, the default setting for a descriptor's ownership could be "operating system".

The information stored in the table 40 may become obsolete when routing instructions within the computer system change. This could happen as a result of policy changes, for example when an application no longer runs with Level 5, or, more commonly, as a result of load balancing decisions within the computer system or other route updates caused by network topology changes. The information in the table 40 should be checked when such a change occurs. A convenient way of arranging the checking procedure is to reset a descriptor's ownership to indeterminate (or K) when such a change occurs so that until the correct new ownership information can be obtained a full processing operation will be carried out for the routing of messages to the operating system or the L5 stack via the socket 2. More generally a single generation counter is associated with each user-level socket state. Incrementing this counter will cause the L5 user stack to leave its fast path processing and determine the state change In a typical system as shown in FIG. 22, each application 1 has its own user-level TCP stack 5 by which it can communicate with its hardware 6. This enables shorter processing times because the application need not share the stack with other applications. As stated above, the stack 5 is in the same address space as its corresponding application. Additionally, each stack 5 is associated with a dedicated driver (not shown) in the kernel 4 of the operating system. In this arrangement, when the application 1 attempts to open a descriptor that is being used by the stack 5, for example a descriptor for accessing the TCP driver in the kernel 4, the operating system 3 cannot identify that there is a conflict because the stack 5 and the application 1 are in the same address space. The conflict arises due to the fact that in order for the L5 stack to operate it requires operating system descriptors, and these descriptors must be allocated from the same address space as the descriptors used by the application. However, the application has no a prior knowledge of the existence of the L5 stack.

A specific example will now be described. The operating system 3 allocates descriptor number 42 for use by the L5 TCP stack 5. The application 1 then sends a Dup2(X,42) call, requesting that descriptor 42 becomes a copy of descriptor X. If this instruction were executed by the operating system it would cause a conflict because descriptor 42 is already in use to identify the stack. Normally such a conflict would be avoided by the operating system preventing one process from having access to a descriptor that is already in use by another process. However, in this case the application and the user-level stack 5 occupy the same application space as far as the operating system is concerned, and so the operating system could not normally allow this Dup2( ) call to proceed, unless the application were to first close the existing resource having descriptor 42. To avoid such a conflict, the socket library 2 intercepts Dup2( ) calls and identifies whether they request a descriptor assigned to the stack to be redefined. The socket library checks in the table 40, which additionally includes a flag indicating whether each descriptor is a private L5 user-level stack descriptor, and if it determines that there will be a clash, a series of operations is carried out by the socket library.

Thus, the socket library intercepts the syscall Dup2(X,42) from the application 1, which is an attempt to transform descriptor X into descriptor 42. The socket library checks the table 40 for a flag indicating that 42 is private to the L5 stack. It determines that it is, and blocks the application's thread, as would happen for any syscall. The library obtains a lock on descriptor 42 to prevent other actions being carried out in relation to it. The library then sends a Dup2(42,Y) call to the operating system, requesting that the current definition of descriptor 42 is duplicated at some unused descriptor Y, so that the stack can subsequently operate with descriptor Y.

If this call fails, for example due to an internal error within the stack 5, the socket library forges a message to the application 1 to indicate that the Dup2(X,42) call from the application failed. On the other hand, if the Dup2(42,Y) call succeeds, the application's thread is released, and the Dup2(X, 42) call can be forwarded by the socket library to the operating system. When the socket library receives a response from the operating system indicating that the Dup2(42,Y) call was successful, it forwards a response to the application, which the application interprets as being confirmation that its Dup2(X,42) call succeeded. The application can then use descriptor 42 and the stack can use the new descriptor Y, and the potential conflict is thus prevented.

The sequence of operations described above can involve a high processing overhead, so to inhibit an application from requesting the use of a descriptor that is in use by the stack, it is preferred that such a descriptor is marked by the operating system as reserved. The operating system would then be unlikely to inform an application that such a descriptor is available and so it is unlikely that the application will request the use of such a descriptor.

The dup2( ) instruction is an example of an instruction to duplicate a descriptor that is used in the Unix and Linux operating systems. Other operating systems may be responsive to other instructions to perform functionally equivalent duplication of descriptors, and similar techniques can be applied to avoid conflicts in those operating systems too.

When a fork( ), exec( ) sequence is performed on an application, the child application can retain the file descriptors of the parent application in such a way that all details of the parent application except the file descriptors are destroyed. By virtue of fork/exec operations with respect to a single user-level transport library, multiple applications can eventually be mapped onto the same state in an operating system. This can lead to considerable contention for the lock, which can be inefficient as applications are generally required to spin or block while they await access to the state.

Figure 24:
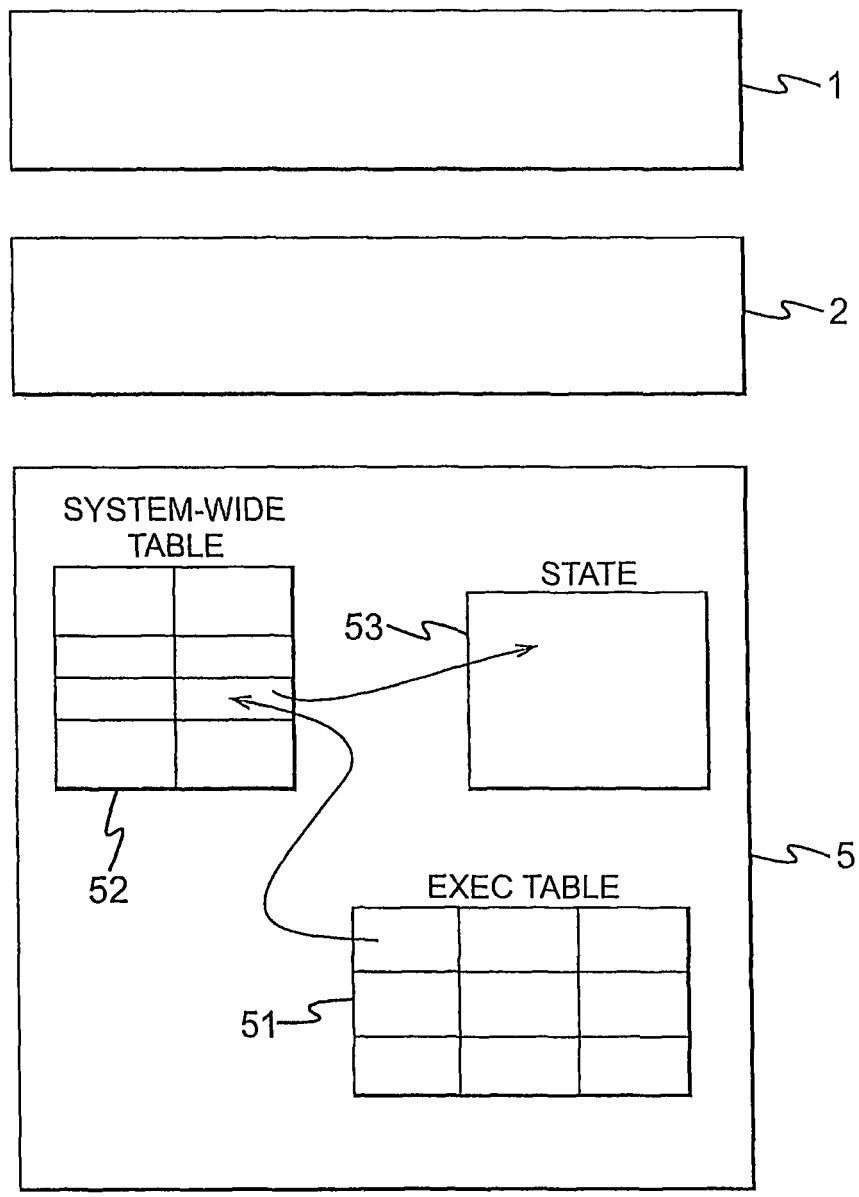
FIG. 24 shows an arrangement of tables in accordance with an embodiment of the present invention.

When a new application is created, it acquires a process ID (PID) which is unique within a host. According to one embodiment as shown in FIG. 24, an exec table 51 is maintained by the L5 operating system 5 in which each record has a PID, pointers to a system-wide file descriptor table 52 which contains pointers to state 53 in the operating system, and file descriptors that are used by that PID, for example having been preserved following an exec( ) call.

In one embodiment, the socket library 2 intercepts an exec( ) call and can read it to reconstruct state data for a new L5 process. When the library has intercepted the exec( ) call, an entry is made in the exec table 51 and the exec( ) call is processed. The new process then starts, and a new L5 library is set up. The init( ) of the new library involves checking via an access of the L5 file descriptor to the exec table 51 of the operating system 5, and the exec table 51 is recreated as a new table (not shown in FIG. 24) in the library. This table can record details of whether a file descriptor has been involved in an exec( ) operation. This table could be the same as the table 40, but preferably it is separate. For efficiency reasons this table can be reconstructed in a "lazy" manner as the new application attempts to access each file descriptor.

The system-wide table 52 maintained by the operating system 5 can keep track of file descriptors which have been preserved following a fork-exec operation. This system-wide table records which file descriptors are in use for which applications. Each file descriptor is assigned a reference number by the operating system 5 which is unique across the system. This can be necessary because two applications which do not communicate with each other can use identical file descriptor numbers without any conflicts occurring. However, it is convenient to be able to identify a particular file descriptor in use by a particular application with a unique number.

The system-wide table 52 also stores pointers for each file descriptor to state 53 within the system. The state associated with a file descriptor of a child process will typically be the same as the state associated with its parent process and the process of reconstruction requires that the newly exec-ed application makes system calls to the L5 driver in order to reattach to the shared state.

As stated above, it can occur that due to multiple fork-exec operations many processes come to be sharing the same state. This is inefficient since a process would have to await access to a lock on the state and this generally involves blocking. To reduce such contention, the operating system 5 preferentially assigns new memory space (a new network interface) to each forked application as it requests its first new file descriptor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A data processing system comprising:
an operating system for supporting processes, each process being associated with one or more resources each identifiable by a file descriptor, the operating system being arranged to police the accessing by processes of resources so as to inhibit a process from accessing resources with which it is not associated, and being responsive to instructions of a certain type to re-initialize a process;
a user-level library for interfacing between each process and the operating system; and
a memory shared between the operating system and the user-level library for storing state information for at least one process, the state information being associated with a resource;
wherein the user-level library is arranged to intercept and analyze instructions from the processes to the operating system, and:
on detecting an instruction to re-initialize a process associated with a resource that is managed by the user-level library, cause state information equivalent to the pre-existing state information associated with said resource to be stored in the memory as state information for the re-initialized process and to be associated with the resource;
on detecting an instruction to re-initialize a process so as to be associated with a resource that is associated with pre-existing state information, store a record of that instruction and then pass the instruction to the operating system; and
on being called to configure state information for a process to check whether it has a record of there having been an instruction to re-initialize that process so as to be associated with a resource that is associated with pre-existing state information and:
if so, cause state information corresponding to that pre-existing state information to be stored in the memory as state information for the process and to be associated with the resource; and
otherwise generate fresh state information for the process.

2. A data processing system as claimed in claim 1, wherein the said instructions include exec( )instructions.

3. A data processing system as claimed in claim 1, wherein the user-level library is arranged to, when two or more resources are associated with the process, cause the said state information corresponding to the said pre-existing state information to be associated with the resource in response to an attempt to access the resource.

4. A data processing system as claimed in claim 1, wherein the operating system is responsive to instructions of another type to duplicate a process.

5. A data processing system as claimed in claim 4, wherein the said instructions of another type include fork( ) instructions.

6. A data processing system as claimed in claim 1, wherein the resource with which the state information is associated is a memory area storing data for transmission and/or reception by the data processing system.

7. A data processing system as claimed in claim 6, wherein the state information is one or more of: data transmission information, reception state information, information defining a virtual hardware interface, TCP windows, information defining unacknowledged buffers and information defining timeout values.

8. A data processing system as claimed in claim 1, wherein the system is arranged to be capable of using the state information to form a memory mapping onto the resource.

9. A data processing system as claimed in claim 1, wherein the operating system has a table indicating which state information is associated with which resource.

10. A data processing system as claimed in claim 1, wherein the right of a process to access a resource is enabled by allocating a file descriptor associated with the resource to the process.

11. A data processing system as claimed in claim 1, wherein a resource can be identifiable by multiple file descriptors.

12. A data processing system as claimed in claim 11, wherein the operating system is arranged to, in response to instructions to re-initialize a process and allocate a new file descriptor to that process, preferentially allocate a new resource to that process, identifiable by the new file descriptor.

13. A non-transitory computer readable medium including a user-level library for use by a data processing system comprising an operating system for supporting processes, each process being associated with one or more resources each identifiable by a file descriptor, the operating system being arranged to police the accessing by processes of resources so as to inhibit a process from accessing resources with which it is not associated, and being responsive to instructions of a certain type to re-initialize a process and a memory shared between the operating system and the user-level library for storing state information for at least one process, the state information being associated with a resource;
wherein the user-level library is for interfacing between each process and the operating system and is arranged to intercept and analyze instructions from the processes to the operating system, the user-level library being arranged to:
on detecting an instruction to re-initialize a process associated with a resource that is managed by the user-level library, cause state information equivalent to that pre-existing state information associated with said resource to be stored in the memory as state information for the re-initialized process and to be associated with the resource;
on detecting an instruction to re-initialize a process so as to be associated with a resource that is associated with pre-existing state information, store a record of that instruction and then pass the instruction to the operating system; and
on being called to configure state information for a process to check whether it has a record of there having been an instruction to re-initialize that process so as to be associated with a resource that is associated with pre-existing state information and:
if so, cause state information corresponding to that pre-existing state information to be stored in the memory as state information for the process and to be associated with the resource; and
otherwise generate fresh state information for the process.

14. A method for processing instructions in a data processing system comprising: an operating system for supporting processes, each process being associated with one or more resources each identifiable by a file descriptor, the operating system being arranged to police the accessing by processes of resources so as to inhibit a process from accessing resources with which it is not associated, and being responsive to instructions of a certain type to re-initialize a process; a user-level library for interfacing between each process and the operating system; and a memory shared between the operating system and the user-level library for storing state information for at least one process, the state information being associated with a resource; the method comprising the steps of:

intercepting and analyzing instructions from the processes to the operating system; and on detecting an instruction to re-initialize a process associated with a resource that is managed by the user-level library, causing state information equivalent to that pre-existing state information associated with said resource to be stored in the memory as state information for the re-initialize process and to be associated with the resource;

on detecting an instruction to re-initialize a process so as to be associated with a resource that is associated with pre-existing state information, storing a record of that instruction and then passing the instruction to the operating system; and on being called to configure state information for a process to check whether it has a record of there having been an instruction to re-initialize that process so as to be associated with a resource that is associated with pre-existing state information and:

if so, causing state information corresponding to that pre-existing state information to be stored in the memory as state information for the process and to be associated with the resource; and otherwise generating fresh state information for the process.

\* \* \* \* \*